(12) United States Patent
Wakioka et al.

(10) Patent No.: US 7,893,170 B2
(45) Date of Patent: *Feb. 22, 2011

(54) CURABLE COMPOSITION HAVING IMPROVED CURABILITY AND ADHESION

(75) Inventors: Masayuki Wakioka, Hirakata (JP); Katsuyu Wakabayashi, Settsu (JP); Toshihiko Okamoto, Takasago (JP); Masato Kusakabe, Settsu (JP)

(73) Assignee: Kaneka Corporation, Osaka (JP)

( * ) Notice: Subject to any disclaimer, the term of this patent is extended or adjusted under 35 U.S.C. 154(b) by 109 days.

This patent is subject to a terminal disclaimer.

(21) Appl. No.: 11/579,551

(22) PCT Filed: Apr. 25, 2005

(86) PCT No.: PCT/JP2005/007804

§ 371 (c)(1),
(2), (4) Date: Aug. 6, 2007

(87) PCT Pub. No.: WO2005/108499

PCT Pub. Date: Nov. 17, 2005

(65) Prior Publication Data

US 2008/0076878 A1 Mar. 27, 2008

(30) Foreign Application Priority Data

| May 7, 2004 | (JP) | ............................. 2004-139110 |
| May 7, 2004 | (JP) | ............................. 2004-139111 |
| May 17, 2004 | (JP) | ............................. 2004-146972 |
| May 17, 2004 | (JP) | ............................. 2004-146973 |
| May 17, 2004 | (JP) | ............................. 2004-146974 |
| May 17, 2004 | (JP) | ............................. 2004-146976 |
| May 17, 2004 | (JP) | ............................. 2004-146977 |

(51) Int. Cl.
*C08F 283/12* (2006.01)
*C08G 77/16* (2006.01)
*C08G 77/18* (2006.01)
*C08G 77/08* (2006.01)

(52) U.S. Cl. ............................ 525/477; 528/16; 528/17

(58) Field of Classification Search .................. 525/477
See application file for complete search history.

(56) References Cited

U.S. PATENT DOCUMENTS

| 4,981,728 A * | 1/1991 | Homma et al. ............... 427/386 |
| 5,296,582 A * | 3/1994 | Fujita et al. .................... 528/27 |
| 5,403,881 A | 4/1995 | Okawa et al. |
| 6,300,453 B1* | 10/2001 | De Buyl et al. ............... 528/18 |
| 7,144,953 B2* | 12/2006 | Ueda et al. ................... 525/100 |
| 7,446,158 B2* | 11/2008 | Okamoto et al. ............ 526/279 |
| 2007/0287780 A1* | 12/2007 | Wakabayashi et al. ....... 524/188 |
| 2008/0033087 A1* | 2/2008 | Okamoto et al. ............ 524/275 |
| 2008/0076878 A1* | 3/2008 | Wakioka et al. .............. 525/190 |
| 2008/0194773 A1* | 8/2008 | Wakioka et al. .............. 525/431 |
| 2008/0287636 A1* | 11/2008 | Wakabayashi et al. ......... 528/17 |
| 2008/0319152 A1* | 12/2008 | Okamoto et al. .............. 528/25 |

FOREIGN PATENT DOCUMENTS

| JP | 6-166810 A | 6/1994 |
| JP | 11-209538 A | 8/1999 |
| JP | 2001-11298 A | 1/2001 |
| JP | 2001-254025 A | 9/2001 |
| WO | WO 01/49774 A2 | 7/2001 |
| WO | WO 0149774 A2 * | 7/2001 |
| WO | WO 03035755 A1 * | 5/2003 |

* cited by examiner

*Primary Examiner*—Randy Gulakowski
*Assistant Examiner*—Mike Dollinger
(74) *Attorney, Agent, or Firm*—Sughrue Mion, PLLC

(57) ABSTRACT

There is provided a curable composition having good curability and adhesion by using a non-organotin catalyst.

The curable composition comprising (A) an organic polymer having a reactive silicon group as a silicon-containing group being capable of crosslinking by forming siloxane bonds, (B) one or more kinds selected from a titanium catalyst, an aluminum catalyst and a zirconium catalyst, and (C) a low molecular weight compound containing a hydrolyzable silicon group and having a molecular weight of 100 to 1,000, characterized in that a ratio (a/b) of the total mole (a) of titanium atoms, aluminum atoms and zirconium atoms of the component (B) to the total mole (b) of silicon atoms of the component (c) is larger than 0.08.

11 Claims, No Drawings

CURABLE COMPOSITION HAVING IMPROVED CURABILITY AND ADHESION

TECHNICAL FIELD

The present invention relates to a curable composition comprising an organic polymer containing a silicon-containing group (hereinafter referred to as a "reactive silicon group") which has hydroxyl group or a hydrolyzable group bonded to the silicon atom and which is capable of crosslinking by forming siloxane bonds.

BACKGROUND ART

An organic polymer containing a reactive silicon group in the molecule has a property such that even at room temperature the organic polymer is cured into a rubbery state by a reaction with moisture in the air. Among the organic polymers having a reactive silicon group in the molecule, organic polymers in which the main chain skeleton is a polyoxyalkylene polymer are disclosed in (Patent Document 1) and the like. Those polyoxyalkylene polymers have already been industrially produced, and are widely used in applications to sealants, adhesives and the like. Representative examples of those organic polymers usually have reactive silicon groups having two hydrolyzable groups bonded to one silicon atom for maintaining elongation and flexibility.

Curable compositions comprising the above described organic polymers are cured by using silanol condensation catalysts, and usually organotin catalysts such as dibutyltin bisacetylacetonate are widely used. However, in recent years, toxicity of organotin compounds is pointed out, and alternative non-tin curing catalysts are desired.

Dealcoholization type silicone compositions using titanium catalysts as a non-organotin catalyst are disclosed in (Patent Document 2), (Patent Document 3) and the like. Those dealcoholization type silicone compositions have already been industrially produced, and are widely used in a variety of applications.

On the other hand, curable compositions prepared by combination use of organic polymers having reactive silicon groups and curing catalysts such as a titanium catalyst, an aluminum catalyst or a zirconium catalyst are disclosed in (Patent Document 4), (Patent Document 5), (Patent Document 6), (Patent Document 7) and the like.

Patent Document 1: JP-52-73998A
Patent Document 2: JP-39-27643B (U.S. Pat. No. 3,175,993)
Patent Document 3: U.S. Pat. No. 3,334,067
Patent Document 4: JP-2002-249672A
Patent Document 5: JP-58-17154A (JP-3-57943B)
Patent Document 6: JP-62-146959A (JP-5-45635B)
Patent Document 7: JP-2004-51809A

DISCLOSURE OF INVENTION

Problem to be Solved by the Invention

In the case of a curable composition disclosed in (Patent Document 4) and the like, namely, a curable composition comprising an organic polymer having reactive silicon groups in combinations of curing catalysts such as a titanium catalyst, an aluminum catalyst or a zirconium catalyst, for the purpose of improving adhesion and storage stability in the case of one-component type composition, it is necessary to add a low molecular weight compound having a hydrolyzable silicon group. However when a titanium catalyst, an aluminum catalyst or a zirconium catalyst is used as a curing catalyst for the organic polymer having reactive silicon groups, there is a problem that curability is degraded significantly depending on an added low molecular weight compound having a hydrolyzable silicon group. Accordingly there is a case where a curing rate becomes slow and practical curability is not exhibited as compared with generally used organotin compounds.

It is well known that the above described reactive silicon group-containing polyoxyalkylene polymers prepared using an organotin catalyst has good adhesion to various articles to be adhered, but in some cases, sufficient adhesion cannot be obtained for organic articles to be hardly adhered such as acrylic resins.

It is an object of the present invention to provide a curable composition which comprises a reactive silicon group-containing organic polymer and one or more kinds selected from catalysts containing no tin such as titanium catalysts, aluminum catalysts and zirconium catalysts and possesses improved curability and adhesion.

Means to Solve the Problem

As a result of a diligent investigation to solve such problems, the present inventors perfected the present invention by discovering that a curable composition having a sufficiently practical curability and adhesion can be obtained by use of a reactive silicon group-containing organic polymer in which three hydroxyl groups or hydrolyzable groups are bonded to one silicon atom and one or more kinds selected from a titanium catalyst, an aluminum catalyst and a zirconium catalyst as a curing catalyst for the above described polymer in combination use of a low molecular weight compound having a hydrolyzable silicon group as an additive, and further by use of a specific ratio of the total mole of titanium atoms, aluminum atoms and zirconium atoms of the above described catalysts to the total mole of silicon atoms of the low molecular weight compound having a hydrolyzable silicon group, although the catalyst concerned is a non-organotin catalyst.

Namely, the present invention relates to a curable composition comprising (A) an organic polymer having, as a silicon-containing group being capable of crosslinking by forming siloxane bonds, a reactive silicon group represented by the general formula (1):

$$—SiX_3 \qquad (1)$$

wherein X is hydroxyl group or a hydrolyzable group and three Xs may be each the same or different, (B) one or more kinds selected from a titanium catalyst, an aluminum catalyst and a zirconium catalyst and (C) a low molecular weight compound containing a hydrolyzable silicon group and having a molecular weight of from 100 to 1,000, characterized in that a ratio (a/b) of the total mole (a) of titanium atoms, aluminum atoms and zirconium atoms of the component (B) to the total mole (b) of silicon atoms of the component (C) is larger than 0.08.

The low molecular weight compound (C) is preferably a silane compound having an amino group.

As a preferred mixing ratio of (A), (B) and (C), with respect to 100 parts by weight of the organic polymer (A) are mixed (B) one or more kinds selected from a titanium catalyst, an aluminum catalyst and a zirconium catalyst in an amount of from 0.1 to 15 parts by weight and (C) the low molecular weight compound in an amount of from 0.1 to 15 parts by weight.

The main chain skeleton of the organic polymer (A) is preferably at least one selected from the group consisting of polyoxyalkylene polymers, saturated hydrocarbon polymers and (meth)acrylate polymers.

It is preferable that the glass transition temperature of the organic polymer (A) is not more than 20° C.

Preferred examples of the above described titanium catalysts include those represented by the general formula (2):

$\text{Ti(OR}^1)_4$         (2)

wherein $R^1$ is an organic group, and four $R^1$s may be each the same or different, and more preferably titanium chelates.

Preferred examples of the titanium chelates include compounds represented by the general formula (3):

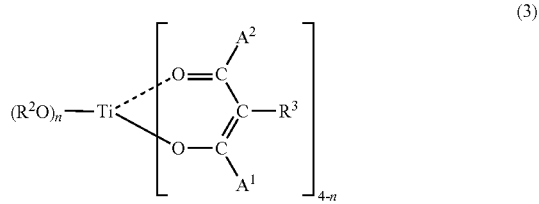

(3)

wherein $R^2$ and $R^3$ are hydrogen atom or a hydrocarbon group having 1 to 20 carbon atoms, $R^2$ and $R^3$ may be the same or different, n $R^2$s may be each the same or different, and (4-n) $R^3$s may be each the same or different; $A^1$ and $A^2$ are selected from —$R^4$ or —$OR^4$ where $R^4$ is a hydrocarbon group having 1 to 20 carbon atoms, $A^1$ and $A^2$ may be the same or different, (4-n) $A^1$s may be each the same or different, and (4-n) $A^2$s may be each the same or different; n is 0, 1, 2 or 3, and/or compounds represented by the general formula (4):

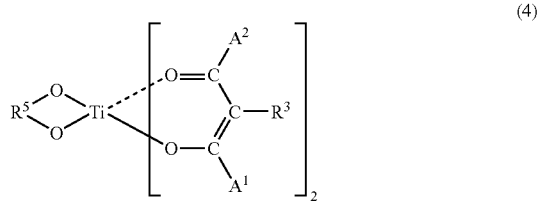

(4)

wherein $R^3$, $A^1$ and $A^2$ are the same as defined above; $R^5$ is a divalent hydrocarbon group having 1 to 20 carbon atoms.

Preferred examples of the above described aluminum catalysts include those represented by the general formula (5):

$\text{Al(OR}^6)_3$         (5)

wherein $R^6$ is an organic group, and three $R^6$s may be each the same or different, and more preferably aluminum chelates.

Preferred examples of the aluminum chelates include compounds represented by the general formula (6):

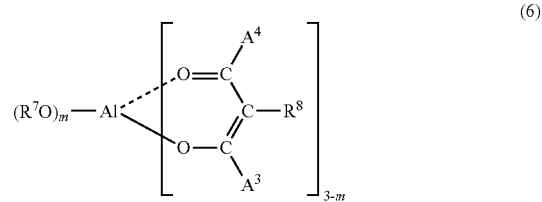

(6)

wherein $R^7$ and $R^8$ are hydrogen atom or a hydrocarbon group having 1 to 20 carbon atoms, $R^7$ and $R^8$ may be the same or different, m $R^7$s may be each the same or different, and (3-m) $R^8$s may be each the same or different; $A^3$ and $A^4$ are selected from —$R^9$ or —$OR^9$ where $R^9$ is a hydrocarbon group having 1 to 20 carbon atoms, $A^3$ and $A^4$ may be the same or different, (3-m) $A^3$s may be each the same or different, and (3-m) $A^4$s may be each the same or different; m is 0, 1 or 2, and/or compounds represented by the general formula (7):

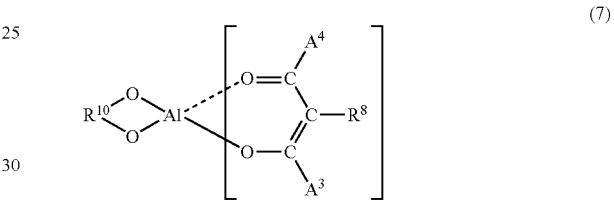

(7)

wherein $R^8$, $A^3$ and $A^4$ are the same as defined above; $R^{10}$ is a divalent hydrocarbon group having 1 to 20 carbon atoms.

Preferred examples of the above described zirconium catalysts include those represented by the general formula (8):

$\text{Zr(OR}^{11})_4$         (8)

wherein $R^{11}$ is an organic group, and four $R^{11}$s may be each the same or different, and more preferably zirconium chelates.

Preferred examples of the zirconium chelates include compounds represented by the general formula (9):

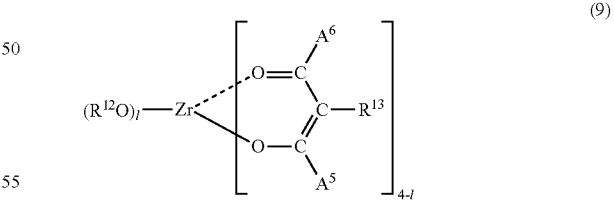

(9)

wherein $R^{12}$ and $R^{13}$ are hydrogen atom or a hydrocarbon group having 1 to 20 carbon atoms, $R^{12}$ and $R^{13}$ may be the same or different, l $R^{12}$s may be each the same or different, and (4-l) $R^{13}$s may be each the same or different; $A^5$ and $A^6$ are selected from —$R^{14}$ or —$OR^{14}$ where $R^{14}$ is a hydrocarbon group having 1 to 20 carbon atoms, $A^5$ and $A^6$ may be the same or different, (4-l) $A^5$s may be each the same or different, and (4-l) $A^6$s may be each the same or different; l is 0, 1, 2 or 3, and/or compounds represented by the general formula (10):

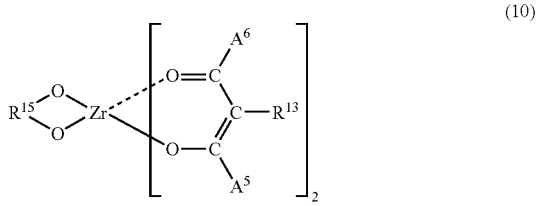
(10)

wherein $R^{13}$, $A^5$ and $A^6$ are the same as defined above; $R^{15}$ is a divalent hydrocarbon group having 1 to 20 carbon atoms.

Titanium catalysts are preferable as the component (B).

Also at least a part of the reactive silicon groups contained in the organic polymer (A) is preferably a hydrolyzable trialkoxysilyl group represented by the general formula (11):

—Si(OR$^{16}$)$_3$ (11)

wherein $R^{16}$ is a substituted or unsubstituted hydrocarbon group, and three $R^{16}$s may be each the same or different, further preferably a trimethoxysilyl group.

Additionally, preferred embodiments of the curable composition of the present invention are sealants or adhesives comprising the curable compositions explained above.

Effect of the Invention

There can be provided curable compositions which comprise a reactive silicon group-containing organic polymer and non-tin curing catalysts such as a titanium catalyst, an aluminum catalyst and a zirconium catalyst, have improved curability and adhesion and are useful for sealants and adhesives.

BEST MODE FOR CARRYING OUT THE INVENTION

The present invention is then explained below in detail.

No particular constraint is imposed on the main chain skeleton of the reactive silicon group-containing organic polymer (A) to be used in the present invention, and polymers having various types of main chain skeletons can be used.

More specifically, examples of the organic polymer (A) include polyoxyalkylene polymers such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers such as ethylene-propylene copolymer, polyisobutylene, copolymers of isobutylene and isoprene and the like, polychloroprene, polyisoprene, copolymers of isoprene or butadiene and acrylonitrile and/or styrene and the like, polybutadiene, copolymers of isoprene or butadiene and acrylonitrile, styrene and the like, hydrogenated polyolefin polymers obtained by hydrogenation of these polyolefin polymers; polyester polymers obtained by the condensation of dibasic acids such as adipic acid and glycol, or by the ring-opening polymerization of lactones; (meth)acrylate polymers obtained by radical polymerization of the monomers such as ethyl (meth)acrylate and butyl (meth)acrylate; vinyl polymers obtained by radical polymerization of (meth) acrylate monomers, vinyl acetate, acrylonitrile or styrene; graft polymers obtained by polymerization of vinyl monomers in the above described organic polymers; polysulfide polymers; polyamide polymers such as nylon 6 obtained by ring-opening polymerization of ε-caprolactam, nylon 6,6 obtained by condensation polymerization of hexamethylenediamine and adipic acid, nylon 6,10 obtained by condensation polymerization of hexamethylenediamine and sebacic acid, nylon 11 obtained by condensation polymerization of ε-aminoundecanoic acid, nylon 12 obtained by ring-opening polymerization of ε-aminolaurolactam, and copolymerized nylons containing two or more components of the above described nylons; polycarbonate polymers prepared by condensation polymerization of, for example, bisphenol A and carbonyl chloride; and diallyl phthalate polymers.

Moreover, saturated hydrocarbon polymers such as polyisobutylene, hydrogenated polyisoprene, and hydrogenated polybutadiene, polyoxyalkylene polymers and (meth)acrylate polymers are more preferable because these polymers are relatively low in glass transition temperature and yield cured articles excellent in low-temperature resistance.

No particular constraint is imposed on the glass transition temperature of the organic polymer of the component (A). The glass transition temperature is preferably not more than 20° C., more preferably not more than 0° C., particularly preferably not more than –20° C. If the glass transition temperature is higher than 20° C., in some cases, a viscosity increases and workability is lowered in wintertime or at a cold district or flexibility and elongation of the cured article are degraded. The above described glass transition temperature denotes values measured by DSC.

In the present invention, with respect to one or more kinds selected from titanium catalysts, aluminum catalysts and zirconium catalysts of the component (B) and the low molecular weight compound of the component (C) having a hydrolyzable silicon group, if the added amounts thereof are abundant, in some cases, the deep-part curability of the obtained composition is degraded. Accordingly, polyoxyalkylene polymers and (meth)acrylate polymers are especially preferable because those polymers are excellent in moisture permeability and are excellent in deep-part curability in the case of one-component type composition, and polyoxyalkylene polymers are most preferable.

The reactive silicon group contained in the organic polymer is a group which has a hydrolyzable group bonded to a silicon atom, and is capable of cross-linking by forming a siloxane bond through a reaction accelerated by a silanol condensation catalyst.

Examples of the reactive silicon groups contained in the reactive silicon group-containing organic polymer used in the present invention include groups represented by the general formula (1):

—SiX$_3$ (1)

wherein X represents hydroxyl group or a hydrolyzable group, and three Xs may be each the same or different.

No particular constraint is imposed on the hydrolyzable group, and the hydrolyzable group may be a hydrolyzable group well known in the art. More specifically, examples of the hydrolyzable group include, for instance, hydrogen atom, a halogen atom, an alkoxy group, an acyloxy group, a ketoximate group, an amino group, an amide group, an acid amide group, an aminooxy group, a mercapto group, an alkenyloxy group and the like. Among these groups, hydrogen atom, an alkoxy group, an acyloxy group, a ketoximate group, an amino group, an amide group, an aminooxy group, a mercapto group and an alkenyloxy group are preferable and an alkoxy group is particularly preferable from the viewpoint that an alkoxy group is moderately hydrolyzable and easily handled. Accordingly particularly preferable are hydrolyzable trialkoxysilyl groups represented by the general formula (11):

wherein $R^{16}$ is a substituted or unsubstituted hydrocarbon group, and three $R^{16}$s may be each the same or different.

More specific examples of the hydrolyzable trialkoxysilyl group include a trimethoxysilyl group, a triethoxysilyl group, a triisopropoxysilyl group, and the like. A trimethoxysilyl group and a triethoxysilyl group are more preferable and a trimethoxysilyl group is particularly preferable because these groups are high in activity and satisfactory curability can be obtained. Additionally, a triethoxysilyl group is particularly preferable because the alcohol produced by the hydrolysis reaction of the reactive silicon group is ethanol and hence a triethoxysilyl group has a high safety.

The number of silicon atoms forming the reactive silicon group is one or more, and is preferably not more than 20 in the case of the silicon atoms connected by siloxane bonds.

The introduction of the reactive silicon group can be carried out by methods well known in the art. More specifically, examples of such methods include the followings.

(a) With an organic polymer having in the molecule functional groups such as hydroxy groups, an organic compound having both an active group exhibiting reactivity to the functional groups and an unsaturated group is reacted, to yield an unsaturated group-containing organic polymer. Alternatively, an unsaturated group-containing organic polymer is obtained by copolymerization of an epoxy compound having an unsaturated group with an organic polymer having in the molecule functional groups such as hydroxy groups. Then, a reactive silicon group-containing hydrosilane is reacted with the reaction product to be hydrosilylated.

(b) With an unsaturated group-containing organic polymer obtained similarly to the method described in (a), a mercapto group- and reactive silicon group-containing compound is reacted.

(c) With an organic polymer having in the molecule functional groups such as hydroxy groups, epoxy groups and isocyanate groups, a compound having a functional group exhibiting reactivity to the functional groups and a reactive silicon group is reacted.

Among the above methods, the method described in (a) or the method described in (c) in which a hydroxy group-terminated polymer is reacted with an isocyanate group- and reactive silicon group-containing compound is preferable because the method provides a high conversion rate at a relatively short reaction time. Additionally, the method described in (a) is particularly preferable because the organic polymer obtained by the method described in (a) is lower in viscosity and more satisfactory in workability than an organic polymer obtained by the method described in (c), and an organic polymer obtained by the method described in (b) is strong in odor due to mercaptosilane.

Examples of the hydrosilane compound used in the method described in (a) include halogenated silanes such as trichlorosilane; alkoxysilanes such as trimethoxysilane and triethoxysilane; and the like. However, the hydrosilane compound used in the method described in (a) is not limited to these compounds. In particular, alkoxysilanes are most preferable because the obtained curable compositions are moderately hydrolyzable and easily handled.

Examples of the synthesis method described in (b) include a method in which a mercapto group- and reactive silicon group-containing compound is introduced into the sites on the unsaturated bonds of an organic polymer by means of a radical addition reaction in the presence of a radical initiator and/or a radical generating source; however, the synthesis method concerned is not limited to these methods. Examples of the above described mercapto group- and reactive silicon group-containing compound include γ-mercaptopropyltrimethoxysilane, γ-mercaptopropyltriethoxysilane, mercaptomethyltrimethoxysilane and mercaptomethyltriethoxysilane; however, the mercapto group- and reactive silicon group-containing compound is not limited to these compounds.

Examples of the method, of the methods described in (c), in which a hydroxy-terminated polymer is reacted with an isocyanate group- and reactive silicon group-containing compound include a method disclosed in Japanese Patent Laid-Open No. 3-47825; however, the method concerned is not limited to these methods. Examples of the above described isocyanate group- and reactive silicon group-containing compound include γ-isocyanatopropyltrimethoxysilane, γ-isocyanatopropyltriethoxysilane, (isocyanatomethyl)trimethoxysilane and (isocyanatomethyl)triethoxysilane; however, the compound concerned is not limited to these compounds.

The reactive silicon group-containing organic polymer may be a straight chain or may have branches, and the number average molecular weight thereof, measured by GPC relative to polystyrene standard, is preferably of the order of 500 to 100,000, more preferably 1,000 to 50,000, particularly preferably 3,000 to 30,000. When the number average molecular weight is less than 500, it tends to be disadvantageous from the viewpoint of an elongation property of the cured article, while when the number average molecular weight exceeds 100,000, it tends to be disadvantageous from the viewpoint of workability because the viscosity becomes high.

For the purpose of obtaining a rubber-like cured article having a high strength, a high elongation property and a low elastic modulus, it is recommended that the number of reactive silicon groups contained in the organic polymer is, on average in one polymer molecule, at least one, and preferably 1.1 to 5. When the average number of reactive silicon groups contained in the molecule is less than 1, the curability becomes insufficient, and hence a satisfactory rubber elasticity behavior can hardly be exhibited. The reactive silicon group may be located at the terminal of the main chain or at the terminal of the side chain, or at the both in the organic polymer molecule chain. In particular, when the reactive silicon group is located only at the terminal of the main chain, the effective network content in the organic polymer component contained in the finally formed cured article becomes large, so that it becomes easier to obtain a rubber-like cured article having a high strength, a high elongation property and a low elastic modulus.

The above described polyoxyalkylene polymer is essentially a polymer having the repeating units represented by the general formula (12):

wherein $R^{17}$ is a linear or branched alkylene group having 1 to 14 carbon atoms. In the general formula (12), $R^{17}$ is preferably a linear or branched alkylene group having 1 to 14 carbon atoms, and more preferably 2 to 4 carbon atoms. Examples of the repeating units represented by the general formula (12) include:

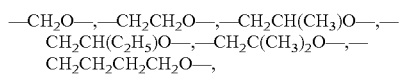

and the like. The main chain skeleton of the polyoxyalkylene polymer may be formed of either only one type of repeating unit or two or more types of repeating units. In particular, in the case where the polymer is used for a sealant and the like, it is preferable that the main chain skeleton is formed of a polymer containing as the main component a propyleneoxide polymer because a polymer having such a main chain skeleton is amorphous and relatively low in viscosity.

Examples of the synthesis method of the polyoxyalkylene polymer include a polymerization method in the presence of an alkaline catalyst such as KOH; a polymerization method in the presence of a transition metal compound-porphyrin complex catalyst prepared by reacting an organoaluminum compound with porphyrin, disclosed in Japanese Patent Laid-Open No. 61-215623; polymerization methods in the presence of composite metal cyanide complex catalysts, disclosed in Japanese Patent Examined Publication Nos. 46-27250 and 59-15336, and U.S. Pat. Nos. 3,278,457, 3,278,458, 3,278,459, 3,427,256, 3,427,334, 3,427,335 and the like; a polymerization method in the presence of a catalyst composed of a polyphosphazene salt disclosed in Japanese Patent Laid-Open No. 10-273512, and a polymerization method in the presence of a catalyst composed of a phosphazene compound disclosed in Japanese Patent Laid-Open No. 11-060722. However, the method concerned is not limited to these methods.

Examples of the preparation method of the reactive silicon group-containing polyoxyalkylene polymer include the methods disclosed in Japanese Patent Examined Publication Nos. 45-36319 and 46-12154, Japanese Patent Laid-Open Nos. 50-156599, 54-6096, 55-13767, 55-13468 and 57-164123, Japanese Patent Examined Publication No. 3-2450, and U.S. Pat. Nos. 3,632,557, 4,345,053, 4,366,307 and 4,960,844; and the methods of preparing polyoxyalkylene polymers each having a high molecular weight such that the number average molecular weight is not less than 6,000 and a narrow molecular weight distribution such that the Mw/Mn value is not more than 1.6, disclosed in Japanese Patent Laid-Open Nos. 61-197631, 61-215622, 61-215623, 61-218632, 3-72527, 3-47825 and 8-231707. However, the method concerned is not limited to these methods.

The above described reactive silicon group-containing polyoxyalkylene polymers may be used either each alone or in combinations of two or more thereof.

The above described saturated hydrocarbon polymers are the polymers which substantially do not contain carbon-carbon unsaturated bonds other than aromatic rings; the polymers forming the skeletons of the saturated hydrocarbon polymers can be obtained by the methods in which (1) olefin compounds having 2 to 6 carbon atoms such as ethylene, propylene, 1-butene and isobutylene are polymerized as main monomers, and (2) diene compounds such as butadiene and isoprene are homopolymerized or copolymerized with the above described olefin compounds and then hydrogenation is applied; however, isobutylene polymers and hydrogenated polybutadiene polymers are preferable because functional groups can be easily introduced into the terminals of these polymers, the molecular weights of these polymers can be easily controlled and the number of terminal functional groups can be increased; and isobutylene polymers are particularly preferable.

The polymers having saturated hydrocarbon polymers as the main chain skeleton are characterized in that the polymers each having such a skeleton are excellent in heat resistance, weather resistance, durability and moisture blocking property.

The isobutylene polymers may be formed in such a way that all the monomer units are solely isobutylene units, or my be copolymers with monomers other than isobutylene units; however, from the viewpoint of the rubber property, in each of the polymers concerned, the content of the repeating units derived from isobutylene is preferably not less than 50 wt %, more preferably not less than 80 wt %, and most preferably 90 to 99 wt %.

As for the synthesis methods of saturated hydrocarbon polymers, various types of polymerization methods have hitherto been reported, particularly among which are many so-called living polymerization methods developed in these years. It has been known that the saturated hydrocarbon polymers, in particular, the isobutylene polymers can be easily produced by use of the inifer polymerization discovered by Kennedy et al. (J. P. Kennedy et al., J. Polymer Sci., Polymer Chem. Ed., Vol. 15, p. 2843 (1997)) in such a way that polymers having the molecular weights of the order of 500 to 100,000 can be polymerized with the molecular weight distribution of not more than 1.5 and various types of functional groups can be introduced into the molecular terminals.

The preparation methods of the reactive silicon group-containing saturated hydrocarbon polymers are described, for example, in Japanese Patent Examined Publication Nos. 4-69659 and 7-108928, Japanese Patent Laid-Open Nos. 63-254149, 64-22904 and 1-197509, Japanese Patent Nos. 2539445 and 2873395, Japanese Patent Laid-Open No. 7-53882 and the like; however, the methods concerned are not particularly limited to these methods.

The above described reactive silicon group-containing saturated hydrocarbon polymers may be used either each alone or in combinations of two or more thereof.

No particular constraint is imposed on the (meth)acrylate monomers constituting the main chains of the above described (meth)acrylate polymers, and various types can be used. Examples of the monomers concerned include (meth) acrylic acid monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth) acrylate, benzyl (meth)acrylate, 2-methoxyethyl (meth)acrylate, 3-methoxybutyl (meth)acrylate, 2-hydroxyethyl (meth) acrylate, 2-hydroxypropyl (meth)acrylate, stearyl (meth) acrylate, glycidyl (meth)acrylate, 2-aminoethyl (meth) acrylate, γ-(methacryloyloxypropyl)trimethoxysilane, γ-(methacryloyloxypropyl)dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, ethylene oxide adduct of (meth)acrylate, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate and 2-perfluorohexadecylethyl (meth)acrylate. For the above described (meth)acrylate polymers, (meth)acrylate monomers can be copolymerized with the following vinyl monomers. Examples of the vinyl monomers concerned include styrene monomers such as styrene, vinyltoluene, α-methylstyrene, chlorostyrene, styrenesulfonic acid and the salts thereof; fluorine-containing vinyl monomers such as perfluoroethylene, perfluoropropylene and fluorinated vinylidene; silicon-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; and vinyl chloride, vinylidene chloride, allyl chloride and allyl alcohol. These monomers may be used each alone or two or more of these monomers may be copolymerized. Among these, from the viewpoint of the physical properties of the products, polymers formed of styrene monomers and (meth)acrylic acid monomers are preferable. More preferable are the (meth) acryl polymers formed of acrylate monomers and methacrylate monomers, and particularly preferable are the acryl polymers formed of acrylate monomers. For general construction applications, the butyl acrylate monomers are further preferable because compositions concerned each are required to have physical properties including a low viscosity, and the cured articles each are required to have physical properties including a low modulus, a high elongation property, a weather resistance and a heat resistance. On the other hand, for applications to vehicles and the like where oil resistance is required, copolymers made of ethyl acrylate as the main material are further preferable. The copolymers made of ethyl acrylate as the main material are excellent in oil resistance, but slightly tend to be poor in low-temperature property (low-temperature resistance); for the purpose of improving the low-temperature property thereof, a part of ethyl acrylates can be replaced with butyl acrylate. However, with the increase of the ratio of butyl acrylate, the satisfactory oil resistance comes to be degraded, so that for the application to the use requiring oil resistance, the ratio of butyl acrylate is set preferably to not more than 40%, and more preferably to not more than 30%. Additionally, it is also preferable to use 2-methoxyethyl acrylate and 2-ethoxyethyl acrylate which have side chain alkyl groups containing oxygen atoms introduced for the purpose of improving the low-temperature property and the like without degrading the oil resistance; in this connection, it is to be noted that the introduction of alkoxy groups having an ether bond in the side chains tends to degrade the heat resistance, so that the ratio of such an acrylate is preferably not more than 40% when heat resistance is required. It is possible to obtain appropriate polymers by varying the ratio in consideration of required physical properties such as oil resistance, heat resistance and low-temperature property according to the various applications and the required objectives. Examples of the polymers excellent in the balance between the physical properties including the oil resistance, heat resistance, low-temperature property and the like include a copolymer of ethyl acrylate/butyl acrylate/2-methoxyethyl acrylate (40 to 50/20 to 30/30 to 20 in a ratio by weight), this copolymer imposing no constraint on the polymers concerned. In the present invention, these preferable monomers can be copolymerized with other monomers, and moreover, block copolymerized with other monomers. In such cases, it is preferable that the preferable monomers are contained in an amount of not less than 40% in a ratio by weight. Incidentally, it is to be noted that in the above form of presentation, for example, "(meth)acrylic acid" means acrylic acid and/or methacrylic acid.

No particular constraint is imposed on the synthesis methods of the (meth)acrylate polymers, and the methods well known in the art can be applied. However, polymers obtained by the usual free radical polymerization methods using azo compounds and peroxides as polymerization initiators have a problem such that the molecular weight distribution values of the polymers are generally as large as not less than 2 and the viscosities of the polymers are high. Accordingly, it is preferable to apply living radical polymerization methods for the purpose of obtaining (meth)acrylate polymers being narrow in molecular weight distribution and low in viscosity, and moreover, having cross-linking functional groups at the molecular chain terminals in a high ratio.

Among "the living radical polymerization methods", "the atom transfer radical polymerization method" in which (meth)acrylate monomers are polymerized by use of an organic halogenated compound or a halogenated sulfonyl compound as an initiator and a transition metal complex as a catalyst has, in addition to the features of the above described "living radical polymerization methods", features such that the obtained polymer has halogen atoms at the terminals relatively favorable for the functional group conversion reaction and freedom for designing the initiator and the catalyst is wide, so that the atom transfer radical polymerization method is further preferable as a method for preparing (meth)acrylate polymers having particular functional groups. Examples of the atom transfer radical polymerization method include the method reported by Matyjaszewski et al. in Journal of the American Chemical Society (J. Am. Chem. Soc.), Vol. 117, p. 5614 (1995).

As a preparation method of a reactive silicon group-containing (meth)acrylate polymer, for example, Japanese Patent Examined Publication Nos. 3-14068 and 4-55444, and Japanese Patent Laid-Open No. 6-211922 and the like disclose preparation methods according to the free radical polymerization methods by using chain transfer agents. Additionally, Japanese Patent Laid-Open No. 9-272714 and the like disclose a preparation method according to the atom transfer radical polymerization method. However, the preparation method concerned is not limited to these methods.

The above described reactive silicon group-containing (meth)acrylate polymers may be used either each alone or in combinations of two or more thereof.

These reactive silicon group-containing organic polymers may be used either each alone or in combinations of two or more thereof. Specifically, there can be used organic polymers formed by blending two or more polymers selected from the group consisting of the reactive silicon group-containing polyoxyalkylene polymers, the reactive silicon group-containing saturated hydrocarbon polymers and the reactive silicon group-containing (meth)acrylate polymers.

The preparation methods of the organic polymers formed by blending the reactive silicon group-containing polyoxyalkylene polymers with the reactive silicon group-containing (meth)acrylate polymers are proposed in Japanese Patent Laid-Open Nos. 59-122541, 63-112642, 6-172631, 11-116763 and the like. However, the preparation method concerned is not limited to these methods. A preferable specific example is a preparation method in which a reactive silicon group-containing polyoxyalkylene polymer is blended with a copolymer formed of two (meth)acrylate monomer units: one (meth)acrylate monomer unit has the reactive silicon groups and alkyl groups having 1 to 8 carbon atoms, and the molecular chain is substantially represented by the following general formula (13):

$$—CH_2—C(R^{18})(COOR^{19})— \quad (13)$$

wherein $R^{18}$ represents hydrogen atom or a methyl group, and $R^{19}$ represents an alkyl group having 1 to 8 carbon atoms; and the other (meth)acrylate monomer unit has alkyl groups having 10 or more carbon atoms and is represented by the following formula (14):

$$—CH_2—C(R^{18})(COOR^{20})— \quad (14)$$

wherein $R^{18}$ is the same as defined above, and $R^{20}$ represents an alkyl group having 10 or more carbon atoms.

In the above general formula (13), examples of $R^{19}$ include alkyl groups having 1 to 8 carbon atoms, preferably 1 to 4 carbon atoms and further preferably 1 to 2 carbon atoms such as a methyl group, an ethyl group, a propyl group, a n-butyl group, a t-butyl group and a 2-ethylhexyl group. It is also to be noted that the alkyl group of $R^{19}$ may represent either one type or admixtures of two or more types.

In the above general formula (14), examples of $R^{20}$ include long chain alkyl groups having 10 or more carbon atoms, usually 10 to 30 carbon atoms, and preferably 10 to 20 carbon atoms such as a lauryl group, a tridecyl group, a cetyl group, a stearyl group and a behenyl group. It is also to be noted that the alkyl group of $R^{20}$ may represent, similarly to $R^{19}$, either one type or admixtures of two or more types.

The molecular chains of the above described (meth)acrylate copolymers are substantially formed of the monomer units represented by formulas (13) and (14): "substantially" as referred to here means that in the copolymer concerned, the sum content of the monomer unit of formula (13) and the monomer unit of formula (14) exceeds 50 wt %. The sum content of the monomer units of formulas (13) and (14) is preferably not less than 70 wt %.

Additionally, the abundance ratio by weight of the monomer unit of formula (13) to the monomer unit of formula (14) is preferably 95:5 to 40:60, and further preferably 90:10 to 60:40.

Examples of the monomer units other than the monomer units of formulas (13) and (14) which may be contained in the above described copolymer include α,β-unsaturated carboxylic acids such as acrylic acid and methacrylic acid; monomers containing amide groups such as acrylamide, methacrylamide, N-methylolacrylamide and N-methylolmethacrylamide, monomers containing epoxy groups such as glycidylacrylate and glycidylmethacrylate, and monomers containing amino groups such as diethylaminoethyl acrylate, diethylaminoethyl methacrylate and aminoethyl vinyl ether; and monomer units derived from acrylonitrile, styrene, α-methylstyrene, alkyl vinyl ethers, vinyl chloride, vinyl acetate, vinyl propionate and ethylene.

The organic polymers formed by blending a reactive silicon group-containing saturated hydrocarbon polymer with a reactive silicon group-containing (meth)acrylate copolymer are proposed in Japanese Patent Laid-Open Nos. 1-168764, 2000-186176 and the like. However the organic polymer concerned is not limited to these organic polymers.

Moreover, for the preparation method of the organic polymers formed by blending the (meth)acrylate copolymers having the reactive silicon functional groups, there can be used additional methods in which (meth)acrylate monomers are polymerized in the presence of a reactive silicon group-containing organic polymer. These methods are disclosed specifically in Japanese Patent Laid-Open Nos. 59-78223, 59-168014, 60-228516, 60-228517 and the like. However, the method concerned is not limited to these methods.

The main chain skeleton of the organic polymer may include other components such as binding urethane components as far as such inclusion does not largely impair the effect of the present invention.

No particular constraint is imposed on the binding urethane components. Examples thereof include groups (hereinafter referred to as amide segments) formed by a reaction of an isocyanate group with an active hydrogen group.

The above described amide segments are groups represented by the general formula (15):

$$—NR^{21}—C(=O)— \quad (15)$$

wherein $R^{21}$ represents hydrogen atom or a substituted or unsubstituted organic group.

Examples of the above described amide segments include a urethane group formed by a reaction of an isocyanate group with hydroxyl group; a urea group formed by a reaction of an isocyanate group with an amino group; a thiourethane group formed by a reaction of an isocyanate group with a mercapto group; and the like. Additionally, in the present invention, groups formed by further reaction of an active hydrogen in the urethane group, urea group or thiourethane group with an isocyanate group are included in the groups of the general formula (15).

Example of an industrially easy method of preparing an organic polymer having both of an amide segment and a reactive silicon group is a method in which after or at the same time of reacting an organic polymer having an active hydrogen-containing group at the terminal with an excessive amount of polyisocyanate compound to yield a polymer having isocyanate groups at the terminals of polyurethane main chains, a part or the whole of isocyanate groups are reacted with a Z group of the silicon compound represented by the general formula (16):

$$Z—R^{22}—SiX_3 \quad (16)$$

wherein X is the same as defined above; $R^{22}$ is a divalent organic group, more preferably a substituted or unsubstituted divalent hydrocarbon group having 1 to 20 carbon atoms; Z is an active hydrogen-containing group selected from hydroxyl group, a carboxyl group, a mercapto group and an amino group (primary or secondary). Known methods of preparing organic polymers in relation to this preparation method are disclosed in Japanese Patent Examined Publication No. 46-12154 (U.S. Pat. No. 3,632,557), Japanese Patent Laid-Open Nos. 58-109529 (U.S. Pat. No. 4,374,237), 62-13430 (U.S. Pat. No. 4,645,816), 8-53528 (EP Patent No. 0676403), and 10-204144 (EP Patent No. 0831108), Japanese Patent Laid-Open No. 2003-508561 (U.S. Pat. No. 6,197,912), Japanese Patent Laid-Open Nos. 6-211879 (U.S. Pat. No. 5,364, 955), 10-53637 (U.S. Pat. No. 5,756,751), 11-100427, 2000-169544, 2000-169545, and 2002-212415, Japanese Patent No. 3313360, U.S. Pat. No. 4,067,844, U.S. Pat. No. 3,711, 445, Japanese Patent Laid-Open No. 2001-323040 and the like.

Additionally, there are methods of preparation by reacting an organic polymer having an active hydrogen-containing group at the terminal with a reactive silicon group-containing isocyanate compound represented by the general formula (17):

$$O=C=N—R^{22}—SiX_3 \quad (17)$$

wherein $R^{22}$ and X are the same as defined above. Known methods of preparing organic polymers in relation to this preparation method are disclosed in Japanese Patent Laid-Open Nos. 11-279249 (U.S. Pat. No. 5,990,257), 2000-119365 (U.S. Pat. No. 6,046,270), 58-29818 (U.S. Pat. No. 4,345,053), 3-47825 (U.S. Pat. No. 5,068,304), 11-60724, 2002-155145, 2002-249538, WO03/018658, WO03/059981 and the like.

Examples of the organic polymers having an active hydrogen-containing group at the terminal include oxyalkylene polymers (polyether polyols) having hydroxyl group at the terminal, polyacryl polyols and polyester polyols, saturated hydrocarbon polymers (polyolefin polyols) having hydroxyl group at the terminal, polythiol compounds, polyamine compounds and the like. Among them, polyether polyols, polyacryl polyols and polyolefin polyols are preferable because the glass transition temperature of the obtained organic polymers is relatively low and the obtained cured articles are excellent in cold resistance. Particularly polyether polyols are preferable because a viscosity of the obtained organic polymers is low, workability is good and deep-part curability is good. Additionally polyacryl polyols and saturated hydrocarbon polymers are more preferable because weather resistance and heat resistance of the cured articles obtained from the organic polymers are good.

Polyether polyols prepared by any of preparation methods can be used, and preferred are polyether polyols having at least 0.7 hydroxyl group per a molecular terminal on average of the whole molecules. Specifically, examples thereof are oxyalkylene polymers prepared by using conventional alkali metal catalysts, oxyalkylene polymers prepared by reacting an initiator such as a polyhydroxy compound having at least two hydroxyl groups with alkylene oxide in the presence of a composite metal cyanide complex and cesium, and the like.

Of the above described polymerization methods, the method using a composite metal cyanide complex is preferable because oxyalkylene polymers having a lower degree of unsaturation, a narrow Mw/Mn, a lower viscosity and high acid resistance and weather resistance can be obtained.

Examples of the above described polyacryl polyols include polyols having an alkyl (meth)acrylate (co)polymer skeleton and containing hydroxy groups in the molecule. As the synthesis method to produce these polymers, the living radical polymerization method is preferable because this method can lead to narrow molecular weight distributions and low viscosities, and the atom transfer radical polymerization method is further preferable. Additionally, it is preferable to use a polymer based on the so-called SGO process which is obtained by continuously block-polymerizing an alkyl acrylate monomer at a high temperature under a high pressure, as described in Japanese Patent Laid-Open No. 2001-207157. Specifically, examples thereof include UH-2000 produced by Toagosei Co., Ltd., and the like.

Examples of the polyisocyanate compound include aromatic polyisocyanates such as toluene (tolylene) diisocyanate, diphenylmethane diisocyanate and xylylene diisocyanate; and aliphatic polyisocyanates such as isophorone diisocyanate and hexamethylene diisocyanate.

No particular constraint is imposed on the silicon compound of the general formula (16). Specifically, examples thereof include silanes having amino group such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane and N-phenylaminomethyltrimethoxysilane; silanes having hydroxy group such as γ-hydroxypropyltrimethoxysilane; silanes having mercapto group such as γ-mercaptopropyltrimethoxysilane; and the like. Additionally, as described in Japanese Patent Laid-Open Nos. 6-211879 (U.S. Pat. No. 5,364,955), 10-53637 (U.S. Pat. No. 5,756,751), 10-204144 (EP Patent No. 0831108), 2000-169544 and 2000-169545, there can be used Michael addition reaction products of various α,β-unsaturated carbonyl compounds and primary amino group-containing silanes and Michael addition reaction products of various (meth) acryloyl group-containing silanes and primary amino group-containing compounds as the silicon compounds of the general formula (16).

No particular constraint is imposed on the reactive silicon group-containing isocyanate compound of the general formula (17). Specifically, examples thereof include γ-trimethoxysilylpropylisocyanate, γ-triethoxysilylpropylisocyanate, trimethoxysilylmethylisocyanate, triethoxysilylmethylisocyanate and the like. Additionally, as described in Japanese Patent Laid-Open No. 2000-119365 (U.S. Pat. No. 6,046,270), a compound obtained by reacting the silicon compound of the general formula (16) with an excessive amount of the above described polyisocyanate compound can be used as the reactive silicon group-containing isocyanate compound of the general formula (17).

When amide segments contained in the main chain skeleton of the organic polymer of the component (A) of the present invention are abundant, the viscosity of the organic polymer becomes high and forms a composition poor in workability as the case may be. On the other hand, curability of the composition of the present invention tends to be enhanced by the amide segments contained in the main chain skeleton of the component (A). Accordingly, when the amide segments are contained in the main chain skeleton of the component (A), the average number of amide segments per molecule is preferably from 1 to 10, more preferably from 1.5 to 7, particularly preferably from 2 to 5. When the number of amide segments is less than 1, in some cases, curability becomes insufficient, and when the number of amide segments is more than 10, the viscosity of the organic polymer becomes high and forms a composition poor in workability.

In the present invention, one or more kinds selected from a titanium catalyst, an aluminum catalyst and a zirconium catalyst are used as the component (B). These catalysts function as a curing catalyst for the organic polymer of component (A). So far organotin compounds such as dibutyltin dilaurate and dibutyltin bisacetylacetonate have been used as a curing catalyst for the reactive silicon group-containing organic polymer of the component (A). However a curable composition having practical curability can be obtained by use of the catalyst (B) of the present invention although the catalyst concerned is a non-organotin catalyst. Additionally, adhesion to organic articles to be hardly adhered such as acrylic resins can be enhanced as compared with the case of using other curing catalysts such as organotin catalysts.

Among titanium catalysts, aluminum catalysts and zirconium catalysts, preferable are titanium catalysts from the viewpoint of curability.

Compounds such as $TiO_2$ which do not function as a curing catalyst for the component (A) are not included in the component (B) of the present invention.

The above described catalysts are compounds having a titanium atom, an aluminum atom or a zirconium atom bonded to hydroxyl groups or substituted or unsubstituted alkoxy groups, and preferred examples of the above described titanium catalysts include those represented by the general formula (2):

$$Ti(OR^1)_4 \qquad (2)$$

wherein R¹ is an organic group, more preferably a substituted or unsubstituted hydrocarbon group having 1 to 20 carbon atoms, and four R¹s may be each the same or different. Of these compounds, titanium alkoxide is a representative compound. Other examples of the compounds represented by the general formula (2) are titanium acylates in which a part or the whole of four OR¹ groups in the general formula (2) are acyloxy groups represented by the general formula (18):

—OCOR²³ (18)

wherein R²³ is an organic group, more preferably a substituted or unsubstituted hydrocarbon group having 1 to 20 carbon atoms.

Additionally, examples of titanium catalysts which are not represented by the general formula (2) are halogenated titanium alkoxides represented by the general formula (19):

TiX¹$_{4-a}$(OR²⁴)$_a$ (19)

wherein X¹ is a halogen atom, and (4-a) X¹s may be each the same or different; R²⁴ is an organic group, more preferably a substituted or unsubstituted hydrocarbon group having 1 to 20 carbon atoms, and a R²⁴s may be each the same or different; a is 1, 2 or 3.

Among the above described catalysts, titanium alkoxides are preferable from the viewpoint of stability to moisture and curability.

Among the titanium catalysts represented by the general formula (2), more preferred are titanium chelates represented by the general formula (3):

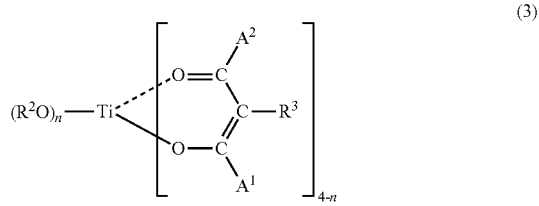

wherein R² and R³ are hydrogen atom or a hydrocarbon group having 1 to 20 carbon atoms, R² and R³ may be the same or different, and n R²s may be each the same or different, and (4-n) R³s may be each the same or different; A¹ and A² are selected from —R⁴ or —OR⁴ where R⁴ is a hydrocarbon group having 1 to 20 carbon atoms, A¹ and A² may be the same or different, (4-n) A¹s may be each the same or different, and (4-n) A²s may be each the same or different; n is 0, 1, 2 or 3, and/or titanium chelates represented by the general formula (4):

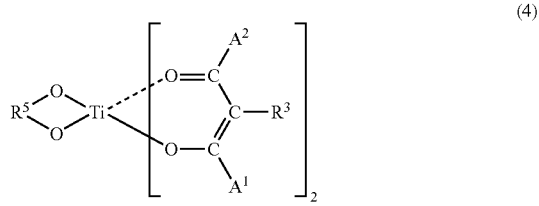

wherein R³, A¹ and A² are the same as defined above; R⁵ is a divalent hydrocarbon group having 1 to 20 carbon atoms, from the viewpoint of high compatibility with the component (A), high catalytic activity and storage stability. The titanium chelates of the general formula (3) are particularly preferable because of high catalytic activity. The titanium chelates of the general formula (3) in which n is 2 are most preferable because crystallinity (melting point) is relatively low, workability is good and a catalytic activity is high.

Examples of the titanium alkoxides represented by the general formula (2) include titanium tetramethoxide, titanium tetraethoxide, titanium tetraallyloxide, titanium tetra-n-propoxide, titanium tetraisopropoxide, titanium tetra-n-butoxide, titanium tetraisobutoxide, titanium tetra-sec-butoxide, titanium tetra-t-butoxide, titanium tetra-n-pentyloxide, titanium tetracyclopentyloxide, titanium tetrahexyloxide, titanium tetracyclohexyloxide, titanium tetrabenzyloxide, titanium tetraoctyloxide, titanium tetrakis(2-ethylhexyloxide), titanium tetradecyloxide, titanium tetradodecyloxide, titanium tetrastearyloxide, titanium tetrabutoxide dimer, titanium tetrakis(8-hydroxyoctyloxide), titanium diisopropoxidebis(2-ethyl-1,3-hexanediolate), titanium bis(2-ethylhexyloxy)bis(2-ethyl-1,3-hexanediolate), titanium tetrakis(2-chloroethoxide), titanium tetrakis(2-bromoethoxide), titanium tetrakis(2-methoxyethoxide), titanium tetrakis(2-ethoxyethoxide), titanium butoxidetrimethoxide, titanium dibutoxidedimethoxide, titanium butoxidetriethoxide, titanium dibutoxidediethoxide, titanium butoxidetriisopropoxide, titanium dibutoxidediisopropoxide, titanium tetraphenoxide, titanium tetrakis(o-chlorophenoxide), titanium tetrakis(m-nitrophenoxide), titanium tetrakis(p-methylphenoxide), titanium tetrakis(trimethylsilyloxide) and the like.

Examples of the titanium acylates in which a part or the whole of four OR¹ groups in the general formula (2) are groups represented by the general formula (18) include titanium acrylate triisopropoxide, titanium methacrylate triisopropoxide, titanium dimethacrylate diisopropoxide, titanium trimethacrylate isopropoxide, titanium hexanoate triisopropoxide, titanium stearate triisopropoxide and the like.

Examples of the halogenated titanium alkoxides of the general formula (19) include titanium chloride triisopropoxide, titanium dichloride diisopropoxide, titanium isopropoxide trichloride, titanium bromide triisopropoxide, titanium fluoride triisopropoxide, titanium chloride triethoxide, titanium chloride tributoxide and the like.

Examples of the titanium chelates of the general formula (3) or (4) include titanium dimethoxidebis(ethylacetoacetate), titanium dimethoxidebis(acetylacetonate), titanium diethoxidebis(ethylacetoacetate), titanium diethoxidebis (acetylacetonate), titanium diisopropoxidebis(ethylacetoacetate), titanium diisopropoxidebis(methylacetoacetate), titanium diisopropoxidebis(t-butylacetoacetate), titanium diisopropoxidebis(methyl-3-oxo-4,4-dimethylhexanoate), titanium diisopropoxidebis(ethyl-3-oxo-4,4,4-trifluoropentanoate), titanium diisopropoxidebis(acetylacetonate), titanium diisopropoxidebis(2,2,6,6-tetramethyl-3,5-heptanedionate), titanium di-n-butoxidebis(ethylacetoacetate), titanium di-n-butoxidebis(acetylacetonate), titanium diisobutoxidebis(ethylacetoacetate), titanium diisobutoxidebis(acetylacetonate), titanium di-t-butoxidebis(ethylacetoacetate), titanium di-t-butoxidebis(acetylacetonate), titanium di-2-ethylhexoxidebis(ethylacetoacetate), titanium di-2-ethylhexoxidebis(acetylacetonate), 1,2-dioxyethanetitaniumbis(ethylacetoacetate), 1,3-dioxypropanetitaniumbis(ethylacetoacetate), 2,4-dioxypentanetitaniumbis(ethylacetoacetate), 2,4-dimethyl-2,4-dioxypentanetitaniumbis(ethylacetoacetate), titanium diisopropoxidebis(triethanolaminate), titanium tetrakis(ethylacetoacetate), titanium tetrakis(acetylacetonate), titanium bis(trimethylsiloxy)bis(ethylacetoacetate), titanium bis(trimethylsiloxy)bis(acetylacetonate) and the like. Of these titanium chelates, preferred are titanium diethoxidebis(ethylacetoacetate), titanium diethoxidebis (acetylacetonate), titanium diisopropoxidebis(ethylacetoacetate), titanium diisopropoxidebis(acetylacetonate), titanium dibutoxidebis(ethylacetoacetate) and titanium dibutoxidebis (acetylacetonate) because those titanium chelates are easily available and also from the viewpoint of catalytic activity. More preferred are titanium diethoxidebis(ethylacetoacetate), titanium diisopropoxidebis(ethylacetoacetate) and titanium dibutoxidebis(ethylacetoacetate), and most preferred is titanium diisopropoxidebis(ethylacetoacetate).

Examples of the titanium catalysts other than those described above include titanium tris(dioctylphosphate)isopropoxide, titanium tris(dodecylbenzenesulfonate) isopropoxide, dihydroxytitaniumbislactate and the like.

Preferred examples of the chelating agents capable of forming chelate ligands of the above described titanium chelates include β-diketones such as acetylacetone and 2,2,4,4-tetramethyl-3,5-heptanedion; β-ketoesters such as methyl acetoacetate, ethyl acetoacetate, t-butyl acetoacetate, allyl acetoacetate, (2-methacryloxyethyl) acetoacetate, methyl 3-oxo-4,4-dimethylhexanoate and ethyl 3-oxo-4,4,4-trifluorobutanoate; and β-diesters such as dimethyl malonate and diethyl malonate from the viewpoint of curability. β-Diketones and β-ketoesters are more preferred from the viewpoint of curability and storage stability, and β-ketoesters are particularly preferred. Additionally, acetylacetone, methyl acetoacetate and ethyl acetoacetate are more preferred from the viewpoint of curability and storage stability and because those compounds are easily available, and ethyl acetoacetate is particularly preferable. Also when two or more chelate ligands are present, those chelate ligands may be the same or different.

When the above described titanium chelates are added as the component (B) of the present invention, the following methods (d) and (e) can be employed; (d) a method of adding a titanium catalyst chelated beforehand and (e) a method of using a titanium chelate obtained by chelating in a composition in situ by adding a chelating agent such as ethyl acetoacetate and a titanium compound reactable with the chelating agent such as titanium tetraisopropoxide or titanium dichloridediisopropoxide.

Preferred examples of the above described aluminum catalysts include those represented by the general formula (5):

wherein $R^6$ is an organic group, more preferably a substituted or unsubstituted hydrocarbon group having 1 to 20 carbon atoms, and three $R^6$s may be each the same or different. Of these compounds, aluminum alkoxide is a representative compound. Other examples of the compounds represented by the general formula (5) are aluminum acylates in which a part or the whole of three $OR^6$ groups in the general formula (5) are acyloxy groups represented by the general formula (20):

wherein $R^{25}$ is an organic group, more preferably a substituted or unsubstituted hydrocarbon group having 1 to 20 carbon atoms.

Additionally, examples of aluminum catalysts which are not represented by the general formula (5) are halogenated aluminum alkoxides represented by the general formula (21):

wherein $X^2$ is a halogen atom, and (3-b) $X^2$s may be each the same or different; $R^{26}$ is an organic group, more preferably a substituted or unsubstituted hydrocarbon group having 1 to 20 carbon atoms, and b $R^{26}$s may be each the same or different; b is 1 or 2.

Among the above described catalysts, aluminum alkoxides are preferable from the viewpoint of stability to moisture and curability.

Among the aluminum catalysts represented by the general formula (5), more preferred are aluminum chelates represented by the general formula (6):

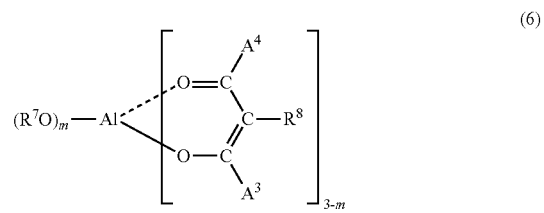

wherein $R^7$ and $R^8$ are hydrogen atom or a hydrocarbon group having 1 to 20 carbon atoms, $R^7$ and $R^8$ may be the same or different, m $R^7$s may be each the same or different, and (3-m) $R^8$s may be each the same or different; $A^3$ and $A^4$ are selected from —$R^9$ or —$OR^9$ where $R^9$ is a hydrocarbon group having 1 to 20 carbon atoms, $A^3$ and $A^4$ may be the same or different, (3-m) $A^3$s may be each the same or different, and (3-m) $A^4$s may be each the same or different; m is 0, 1 or 2, and/or aluminum chelates represented by the general formula (7):

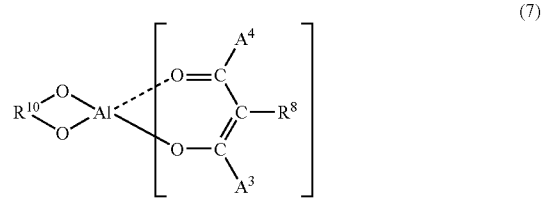

wherein $R^8$, $A^3$ and $A^4$ are the same as defined above; $R^{10}$ is a divalent hydrocarbon group having 1 to 20 carbon atoms, from the viewpoint of high compatibility with the component (A), high catalytic activity and storage stability. The aluminum chelates of the general formula (6) are particularly preferable because of high catalytic activity.

Examples of the aluminum alkoxide represented by the general formula (5) include aluminum trimethoxide, aluminum triethoxide, aluminum triallyloxide, aluminum tri-n-propoxide, aluminum triisopropoxide, aluminum tri-n-butoxide, aluminum triisobutoxide, aluminum tri-sec-butoxide, aluminum tri-t-butoxide, aluminum tri-n-pentyloxide, aluminum tricyclopentyloxide, aluminum trihexyloxide, aluminum tricyclohexyloxide, aluminum tribenzyloxide, aluminum trioctyloxide, aluminum tris(2-ethylhexyloxide), aluminum tridecyloxide, aluminum tridodecyloxide, aluminum tristearyloxide, aluminum tributoxide dimer, aluminum tris(8-hydroxyoctyloxide), aluminum isopropoxidebis(2-ethyl-1,3-hexanediolate), aluminum diisopropoxide(2-ethyl-1,3-hexanediolate), aluminum(2-ethylhexyloxy)bis(2-ethyl-1,3-hexanediolate), aluminum bis(2-ethylhexyloxy) (2-ethyl-1,3-hexanediolate), aluminum tris(2-chloroethoxide), aluminum tris(2-bromoethoxide), aluminum tris(2-methoxyethoxide), aluminum tris(2-ethoxyethoxide), aluminum butoxidedimethoxide, aluminum methoxidedibutoxide, aluminum butoxidediethoxide, aluminum ethoxidedibutoxide, aluminum butoxidediisopropoxide, aluminum isopropoxidedibutoxide, aluminum triphenoxide, aluminum tris(o-chlorophenoxide), aluminum tris(m-nitrophenoxide), aluminum tris(p-methylphenoxide) and the like.

Examples of the aluminum acylates in which a part or the whole of three $OR^6$ groups in the general formula (5) are groups represented by the general formula (20) include aluminum acrylate diisopropoxide, aluminum methacrylate diisopropoxide, aluminum isopropoxide dimethacrylate, aluminum hexanoate diisopropoxide, aluminum stearate diisopropoxide and the like.

Examples of the halogenated aluminum alkoxides of the general formula (21) include aluminum chloride diisopropoxide, aluminum isopropoxide dichloride, aluminum bromide diisopropoxide, aluminum fluoride diisopropoxide, aluminum chloride diethoxide, aluminum chloride dibutoxide and the like.

Examples of the aluminum chelates of the general formula (6) or (7) include aluminum methoxidebis(ethylacetoacetate), aluminum methoxidebis(acetylacetonate), aluminum ethoxidebis(ethylacetoacetate), aluminum ethoxidebis(acetylacetonate), aluminum isopropoxidebis(ethylacetoacetate), aluminum isopropoxidebis(methylacetoacetate), aluminum isopropoxidebis(t-butylacetoacetate), aluminum dimethoxide(ethylacetoacetate), aluminum dimethoxide(acetylacetonate), aluminum diethoxide(ethylacetoacetate), aluminum diethoxide(acetylacetonate), aluminum diisopropoxide(ethylacetoacetate), aluminum diisopropoxide(methylacetoacetate), aluminum diisopropoxide(t-butylacetoacetate), aluminum isopropoxidebis(methyl-3-oxo-4,4-dimethylhexanoate), aluminum isopropoxidebis(ethyl-3-oxo-4,4,4-trifluoropentanoate), aluminum isopropoxidebis(acetylacetonate), aluminum isopropoxidebis(2,2,6,6-tetramethyl-3,5-heptanedionate), aluminum n-butoxidebis(ethylacetoacetate), aluminum n-butoxidebis(acetylacetonate), aluminum isobutoxidebis(ethylacetoacetate), aluminum isobutoxidebis(acetylacetonate), aluminum t-butoxidebis(ethylacetoacetate), aluminum t-butoxidebis(acetylacetonate), aluminum 2-ethylhexoxidebis(ethylacetoacetate), aluminum 2-ethylhexoxidebis(acetylacetonate), 1,2-dioxyethanealuminum(ethylacetoacetate), 1,3-dioxypropanealuminum(ethylacetoacetate), 2,4-dioxypentanealuminum(ethylacetoacetate), 2,4-dimethyl-2,4-dioxypentanealuminum(ethylacetoacetate), aluminum isopropoxidebis(triethanolaminate), aluminum tris(ethylacetoacetate), aluminum tris(acetylacetonate), aluminum (acetylacetonate)bis(ethylacetoacetate) and the like. Of these aluminum chelates, preferred are aluminum ethoxidebis(ethylacetoacetate), aluminum ethoxidebis(acetylacetonate), aluminum isopropoxidebis(ethylacetoacetate), aluminum isopropoxidebis(acetylacetonate), aluminum butoxidebis(ethylacetoacetate), aluminum butoxidebis(acetylacetonate), aluminum dimethoxide(ethylacetoacetate), aluminum dimethoxide(acetylacetonate), aluminum diethoxide(ethylacetoacetate), aluminum diethoxide(acetylacetonate), aluminum diisopropoxide(ethylacetoacetate), aluminum diisopropoxide(methylacetoacetate) and aluminum diisopropoxide(t-butylacetoacetate) because those aluminum chelates are easily available and also from the viewpoint of catalytic activity. More preferred are aluminum ethoxidebis(ethylacetoacetate), aluminum isopropoxidebis(ethylacetoacetate), aluminum butoxidebis(ethylacetoacetate), aluminum dimethoxide(ethylacetoacetate), aluminum diethoxide(ethylacetoacetate) and aluminum diisopropoxide (ethylacetoacetate), and most preferred are aluminum isopropoxidebis(ethylacetoacetate) and aluminum diisopropoxide (ethylacetoacetate).

Examples of the aluminum catalysts other than those described above include aluminum bis(dioctylphosphate)isopropoxide, aluminum bis(dodecylbenzenesulfonate)isopropoxide, hydroxyaluminumbislactate and the like.

Preferred examples of the chelating agents capable of forming chelate ligands of the above described aluminum chelates include β-diketones such as acetylacetone and 2,2,4,4-tetramethyl-3,5-heptanedion; β-ketoesters such as methyl acetoacetate, ethyl acetoacetate, t-butyl acetoacetate, allyl acetoacetate, (2-methacryloxyethyl) acetoacetate, methyl 3-oxo-4,4-dimethylhexanoate and ethyl 3-oxo-4,4,4-trifluorobutanoate; and β-diesters such as dimethyl malonate and diethyl malonate from the viewpoint of curability. β-Diketones and β-ketoesters are more preferred from the viewpoint of curability and storage stability, and β-ketoesters are particularly preferred. Additionally, when two or more chelate ligands are present, those chelate ligands may be the same or different.

When the above described aluminum chelates are added as the component (B) of the present invention, the following methods (d) and (e) can be employed; (d) a method of adding an aluminum catalyst chelated beforehand and (e) a method of using an aluminum chelate obtained by chelating in a composition in situ by adding a chelating agent such as ethyl acetoacetate and an aluminum compound reactable with the chelating agent such as aluminum triisopropoxide or aluminum chloridediisopropoxide.

Preferred examples of the above described zirconium catalysts include those represented by the general formula (8):

$$Zr(OR^{11})_4 \qquad (8)$$

wherein $R^{11}$ is an organic group, more preferably a substituted or unsubstituted hydrocarbon group having 1 to 20 carbon atoms, and four $R^{11}$s may be each the same or different. Of these compounds, zirconium alkoxide is a representative compound. Other examples of the compounds represented by the general formula (8) are zirconium acylates in which a part or the whole of four $OR^{11}$ groups in the general formula (8) are acyloxy groups represented by the general formula (22):

$$-OCOR^{27} \qquad (22)$$

wherein $R^{27}$ is an organic group, more preferably a substituted or unsubstituted hydrocarbon group having 1 to 20 carbon atoms.

Additionally, examples of zirconium catalysts which are not represented by the general formula (8) are halogenated zirconium alkoxides represented by the general formula (23):

$$ZrX^3{}_{4-c}(OR^{28})_c \qquad (23)$$

wherein $X^3$ is a halogen atom, and (4-c) $X^3$s may be each the same or different; $R^{28}$ is an organic group, more preferably a substituted or unsubstituted hydrocarbon group having 1 to 20 carbon atoms, and c $R^{28}$s may be each the same or different; c is 1, 2 or 3.

Among the above described catalysts, zirconium alkoxides are preferable from the viewpoint of stability to moisture and curability.

Among the zirconium catalysts represented by the general formula (8), more preferred are zirconium chelates represented by the general formula (9):

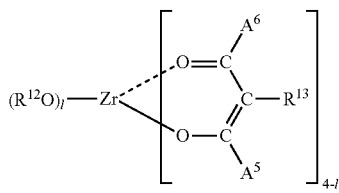

(9)

wherein $R^{12}$ and $R^{13}$ are hydrogen atom or a hydrocarbon group having 1 to 20 carbon atoms, $R^{12}$ and $R^{13}$ may be the same or different, l $R^{12}$s may be each the same or different, and (4-l) $R^{13}$s may be each the same or different; $A^5$ and $A^6$ are selected from $—R^{14}$ or $—OR^{14}$ where $R^{14}$ is a hydrocarbon group having 1 to 20 carbon atoms, $A^5$ and $A^6$ may be the same or different, (4-l) $A^5$s may be each the same or different, and (4-l) $A^6$s may be each the same or different; l is 0, 1, 2 or 3, and/or zirconium chelates represented by the general formula (10):

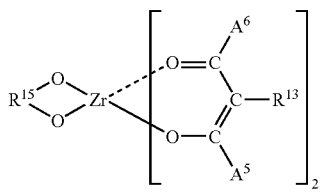

(10)

wherein $R^{13}$, $A^5$ and $A^6$ are the same as defined above; $R^{15}$ is a divalent hydrocarbon group having 1 to 20 carbon atoms, from the viewpoint of high compatibility with the component (A), high catalytic activity and storage stability. The zirconium chelates of the general formula (9) are particularly preferable because of high catalytic activity.

Examples of the zirconium alkoxide represented by the general formula (8) include zirconium tetramethoxide, zirconium tetraethoxide, zirconium tetraallyloxide, zirconium tetra-n-propoxide, zirconium tetraisopropoxide, zirconium tetra-n-butoxide, zirconium tetraisobutoxide, zirconium tetra-sec-butoxide, zirconium tetra-t-butoxide, zirconium tetra-n-pentyloxide, zirconium tetracyclopentyloxide, zirconium tetrahexyloxide, zirconium tetracyclohexyloxide, zirconium tetrabenzyloxide, zirconium tetraoctyloxide, zirconium tetrakis(2-ethylhexyloxide), zirconium tetradecyloxide, zirconium tetradodecyloxide, zirconium tetrastearyloxide, zirconium tetrabutoxide dimer, zirconium tetrakis(8-hydroxyoctyloxide), zirconium diisopropoxidebis(2-ethyl-1,3-hexanediolate), zirconiumbis(2-ethylhexyloxy)bis(2-ethyl-1,3-hexanediolate), zirconium tetrakis(2-chloroethoxide), zirconium tetrakis(2-bromoethoxide), zirconium tetrakis(2-methoxyethoxide), zirconium tetrakis(2-ethoxyethoxide), zirconium butoxidetrimethoxide, zirconium dibutoxidedimethoxide, zirconium butoxidetriethoxide, zirconium dibutoxidediethoxide, zirconium butoxidetriisopropoxide, zirconium dibutoxidediisopropoxide, zirconium tetraphenoxide, zirconium tetrakis(o-chlorophenoxide), zirconium tetrakis(m-nitrophenoxide), zirconium tetrakis(p-methylphenoxide) and the like.

Examples of the zirconium acylates in which a part or the whole of four $OR^{11}$ groups in the general formula (8) are groups represented by the general formula (22) include zirconium acrylate triisopropoxide, zirconium methacrylate triisopropoxide, zirconium dimethacrylate diisopropoxide, zirconium isopropoxide trimethacrylate, zirconium hexanoate triisopropoxide, zirconium stearate triisopropoxide and the like.

Examples of the halogenated zirconium alkoxides of the general formula (23) include zirconium chloride triisopropoxide, zirconium dichloride diisopropoxide, zirconium isopropoxide trichloride, zirconium bromide triisopropoxide, zirconium fluoride triisopropoxide, zirconium chloride triethoxide, zirconium chloride tributoxide and the like.

Examples of the zirconium chelates of the general formula (9) or (10) include zirconium dimethoxidebis(ethylacetoacetate), zirconium dimethoxidebis(acetylacetonate), zirconium diethoxidebis(ethylacetoacetate), zirconium diethoxidebis(acetylacetonate), zirconium diisopropoxidebis(ethylacetoacetate), zirconium diisopropoxidebis(methylacetoacetate), zirconium diisopropoxidebis(t-butylacetoacetate), zirconium trimethoxide(ethylacetoacetate), zirconium trimethoxide(acetylacetonate), zirconium triethoxide(ethylacetoacetate), zirconium triethoxide(acetylacetonate), zirconium triisopropoxide(ethylacetoacetate), zirconium triisopropoxide(acetylacetonate), zirconium triisopropoxide(methylacetoacetate), zirconium triisopropoxide(t-butylacetoacetate), zirconium tri-n-butoxide(ethylacetoacetate), zirconium tri-n-butoxide(acetylacetonate), zirconium methoxidetris(ethylacetoacetate), zirconium methoxidetris(acetylacetonate), zirconium ethoxidetris(ethylacetoacetate), zirconium ethoxidetris(acetylacetonate), zirconium isopropoxidetris(ethylacetoacetate), zirconium isopropoxidetris(acetylacetonate), zirconium isopropoxidetris(methylacetoacetate), zirconium isopropoxidetris(t-butylacetoacetate), zirconium n-butoxidetris(ethylacetoacetate), zirconium n-butoxidetris(acetylacetonate), zirconium n-butoxide(acetylacetonate)bis(ethylacetoacetate), zirconium diisopropoxidebis(methyl-3-oxo-4,4-dimethylhexanoate), zirconium diisopropoxidebis(ethyl-3-oxo-4,4,4-trifluoropentanoate), zirconium diisopropoxidebis(acetylacetonate), zirconium diisopropoxidebis(2,2,6,6-tetramethyl-3,5-heptanedionate), zirconium di-n-butoxidebis(ethylacetoacetate), zirconium di-n-butoxidebis(acetylacetonate), zirconium diisobutoxidebis(ethylacetoacetate), zirconium diisobutoxidebis(acetylacetonate), zirconium di-t-butoxidebis(ethylacetoacetate), zirconium di-t-butoxidebis(acetylacetonate), zirconium di-2-ethylhexoxidebis(ethylacetoacetate), zirconium di-2-ethylhexoxidebis(acetylacetonate), 1,2-dioxyethane zirconiumbis(ethylacetoacetate), 1,3-dioxypropane zirconiumbis(ethylacetoacetate), 2,4-dioxypentane zirconiumbis(ethylacetoacetate), 2,4-dimethyl-2,4-dioxypentane zirconiumbis(ethylacetoacetate), zirconium diisopropoxidebis(triethanolaminate), zirconium tetrakis(ethylacetoacetate), zirconium tetrakis(acetylacetonate) and the like. Of these zirconium chelates, preferred are zirconium diethoxidebis(ethylacetoacetate), zirconium diethoxidebis(acetylacetonate), zirconium diisopropoxidebis(ethylacetoacetate), zirconium diisopropoxidebis(acetylacetonate), zirconium dibutoxidebis(ethylacetoacetate), zirconium dibutoxidebis(acetylacetonate), zirconium triisopropoxide(ethylacetoacetate), zirconium triisopropoxide(acetylacetonate), zirconium tri-n-butoxide(ethylacetoacetate), zirconium tri-n-butoxide(acetylacetonate), zirconium isopropoxidetris(ethylacetoacetate), zirconium isopropoxidetris(acetylacetonate), zirconium n-butoxidetris(ethylacetoacetate), zirconium n-butoxidetris(methylacetoacetate) and zirconium n-butoxide (acetylacetonate)bis(ethylacetoacetate) because those zirconium chelates are easily available and also from the viewpoint of catalytic activity. More preferred are zirconium diethoxidebis(ethylacetoacetate), zirconium diisopropoxidebis (ethylacetoacetate), zirconium dibutoxidebis(ethylacetoacetate), zirconium triisopropoxide(ethylacetoacetate), zirconium tri-n-butoxide(ethylacetoacetate), zirconium isopropoxidetris(ethylacetoacetate), zirconium n-butoxidetris (ethylacetoacetate) and zirconium n-butoxide(acetylacetonate)bis(ethylacetoacetate), and most preferred are zirconium diisopropoxidebis(ethylacetoacetate), zirconium triisopropoxide(ethylacetoacetate) and zirconium isopropoxidetris(ethylacetoacetate).

Examples of the zirconium catalysts other than those described above include zirconium tris(dioctylphosphate) isopropoxide, zirconium tris(dodecylbenzenesulfonate)isopropoxide, dihydroxy zirconiumbislactate and the like.

Preferred examples of the chelating agents capable of forming chelate ligands of the above described aluminum chelates include β-diketones such as acetylacetone and 2,2,4,4-tetramethyl-3,5-heptanedion; β-ketoesters such as methyl acetoacetate, ethyl acetoacetate, t-butyl acetoacetate, allyl acetoacetate, (2-methacryloxyethyl) acetoacetate, methyl 3-oxo-4,4-dimethylhexanoate and ethyl 3-oxo-4,4,4-trifluorobutanoate; and β-diesters such as dimethyl malonate and diethyl malonate from the viewpoint of curability. β-Diketones and β-ketoesters are more preferred from the viewpoint of curability and storage stability, and β-ketoesters are particularly preferred. Additionally, when two or more chelate ligands are present, those chelate ligands may be the same or different.

When the above described zirconium chelates are added as the component (B) of the present invention, the following methods (d) and (e) can be employed; (d) a method of adding a zirconium catalyst chelated beforehand and (e) a method of using a zirconium chelate obtained by chelating in a composition in situ by adding a chelating agent such as ethyl acetoacetate and a zirconium compound reactable with the chelating agent such as zirconium tetraisopropoxide or zirconium dichloride diisopropoxide.

The catalysts of the component (B) may be used either each alone or in combinations of two or more thereof.

In the present invention, a low molecular weight compound which has the molecular weight of from 100 to 1,000 and contains hydrolyzable silicon groups can be used as the component (C). The component (C) is not limited particularly as long as it is a compound having the molecular weight of from 100 to 1,000 and containing hydrolyzable silicon groups, and various compounds can be used. Specifically, examples thereof include (C1) a silane coupling agent having hydrolyzable silicon groups and other functional groups and (C2) a compound having only reactive silicon groups as the functional group.

The silane coupling agent of the above described component (C1) is a compound capable of functioning as an adhesion-imparting agent, a physical properties-imparting agent, a dehydrating agent, a dispersibility-improving agent for an inorganic filler and the like. Examples of the reactive silicon group of the silane coupling agent are groups represented by the general formula (24):

$$-(SiR^{29}_{2-e}Y_eO)_k-SiR^{30}_{3-d}Y_d \qquad (24)$$

wherein $R^{29}$ and $R^{30}$ are each independently alkyl groups having 1 to 20 carbon atoms, aryl groups having 6 to 20 carbon atoms, aralkyl group having 7 to 20 carbon atoms or triorganosiloxy groups represented by $R'_3SiO-$; when two or more $R^{29}$ or $R^{30}$ are present, each of them may be the same or different; R' is a hydrocarbon group having 1 to 20 carbon atoms, and three R's may be the same or different; Y represents a hydrolyzable group, and when two or more Ys are present, each of them may be the same or different; d is 0, 1, 2 or 3; e is 0, 1 or 2; in the k $(SiR^{29}_{2-e}Y_eO)$ groups, e may be the same or different; k is an integer of 0 to 19; $d+\Sigma e \geq 1$ is to be satisfied.

No particular constraint is imposed on Y in the above described general formula (24), and the hydrolyzable group has only to be a hydrolyzable group well known in the art. More specifically, examples of the hydrolyzable group include hydrogen atom, a halogen atom, an alkoxy group, an acyloxy group, a ketoximate group, an amino group, an amide group, an acid amide group, an aminooxy group, a mercapto group, an alkenyloxy group and the like. Among these groups, hydrogen atom, an alkoxy group, an acyloxy group, a ketoximate group, an amino group, an amide group, an aminooxy group, a mercapto group and an alkenyloxy group are preferable; an alkoxy group is particularly preferable from the viewpoint that an alkoxy group is moderately hydrolyzable and easily handled. More specifically, a methoxy group and an ethoxy group are preferable from the viewpoint of a hydrolyzation rate. The number of hydrolyzable groups is preferably not less than two, particularly preferably not less than 3.

Examples of the functional groups other than hydrolyzable silicon groups include primary, secondary and tertiary amino groups, mercapto groups, epoxy groups, carboxyl groups, vinyl groups, isocyanate groups, isocyanurate, halogens and the like. Among them, primary, secondary and tertiary amino groups, epoxy groups, isocyanate groups and isocyanurate are preferred because an effect of improving adhesion is high, and amino groups are more preferred and primary amino groups are particularly preferred.

Specific examples of the silane coupling agent include isocyanate group-containing silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl)trimethoxysilane, (isocyanatemethyl)dimethoxymethylsilane, (isocyanatemethyl)triethoxysilane, and (isocyanatemethyl)diethoxymethylsilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane and N,N'-bis[3-(trimethoxysilyl)propyl] ethylenediamine; ketimine type silanes such as N-(1,3-dimethylbutylidene)-3-(triethoxysilyl)-1-propaneamine; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane and mercaptomethyltriethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis(2-methoxyethoxy)silane and N-β-(carboxymethyl)aminoethyl-γ-aminopropyltrimethoxysilane; vinyl-type unsaturated group-containing silanes such as vinyltrimethoxysilane, vinyltriethoxysilane, γ-methacryloyloxypropylmethyldimethoxysilane, γ-acryloyloxypropyltriethoxysilane and methacryloyloxymethyltrimethoxysilane; halogen-containing silanes such as γ-chloropropyltrimethoxysilane; and isocyanurate silanes such as tris(3-trimethoxysilylpropyl)isocyanurate, and the like. Additionally, the following derivatives obtained by modifying these compounds can be used as silane coupling agents: amino-modified silylpolymer, silylated aminopolymer, unsaturated aminosilane complex, phenylamino-long chain alkylsilane, aminosilylated silicone and silylated polyester. Additionally, there can be used the reaction products of the above described silane coupling agents such as reaction products of the above described amino silanes and epoxy silanes, reaction products of the above described amino silanes and isocyanate silanes and partially condensed products of various silane coupling agents.

The compound of the component (C2) having only hydrolyzable silicon groups as the functional group can function as a dehydrating agent, a crosslinking agent, a physical properties-imparting agent and the like. The component (C2) is not limited particularly as long as it is a compound having the molecular weight of from 100 to 1000 and containing only reactive silicon groups as the functional group, and various compounds can be used.

Specifically, examples thereof include compounds represented by the general formula (25):

$$R^{31}_f Si(OR^{32})_{4-f} \quad (25)$$

wherein $R^{31}$ and $R^{32}$ are hydrocarbon groups having 1 to 20 carbon atoms, and $R^{31}$ and $R^{32}$ may be the same or different; f is 0, 1, 2 or 3, or partially hydrolyzed condensates thereof.

Specific examples of the component (C2) include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane and tetra-t-butoxysilane; trialkoxysilanes such as methyltrimethoxysilane, methyltriethoxysilane, methyltriisopropoxysilane, methyltriphenoxysilane, ethyltrimethoxysilane, butyltrimethoxysilane and phenyltrimethoxysilane; dialkoxysilanes such as dimethyldimethoxysilane, diethyldimethoxysilane and diphenyldimethoxysilane; monoalkoxysilanes such as trimethylmethoxysilane and triphenylmethoxysilane; alkylisopropenoxysilanes such as dimethyldiisopropenoxysilane and methyltriisopropenoxysilane; and the partially hydrolyzed condensates of these silanes.

Partially hydrolyzed condensates of organosilicate compounds are commercially available. Examples of such condensates include Methyl silicate 51 and Ethyl silicate 40 (both are products of Colcoat Co., Ltd.).

The low molecular weight compound of the component (C) having the molecular weight of from 100 to 1,000 and containing hydrolyzable silicon groups may be used either each alone or in combinations of two or more thereof.

In the present invention, it is essential that the ratio (a/b) of the total mole (a) of titanium atoms, aluminum atoms and zirconium atoms of the component (B) in the composition to the total mole (b) of silicon atoms of the component (C) in the composition is larger than 0.08. If the ratio a/b is not more than 0.08, a curing rate is lowered significantly, and in the case of use for sealants, adhesives and the like, practical curability cannot be obtained. From the viewpoint of curability, storage stability and adhesion of a surface of the obtained cured article, the value of a/b is preferably larger than 0.10, especially preferably larger than 0.15.

The used amount of the component (B) is preferably of the order of 0.1 to 15 parts by weight, and more preferably of the order of 0.5 to 10 parts by weight, especially preferably of the order of 2 to 8 parts by weight with respect to 100 parts by weight of the component (A), so that the value of a/b is larger than 0.08. When the blended amount of the component (B) is less than the above described ranges, sometimes the practical curing rate cannot be obtained, and the curing reaction hardly proceeds to a sufficient extent. On the other hand, when the blended amount of the component (B) exceeds the above described ranges, sometimes the work life becomes too short and the workability is degraded.

The used amount of the component (C) is preferably of the order of 0.1 to 15 parts by weight, and more preferably of the order of 1 to 10 parts by weight, especially preferably of the order of 3 to 7 parts by weight with respect to 100 parts by weight of the component (A), so that the value of a/b is larger than 0.08. When the blended amount of the component (C) is less than the above described ranges, sometimes adhesion and storage stability become insufficient, and improvement effect of the tensile properties becomes insufficient. On the other hand, when the blended amount of the component (C) exceeds the above described ranges, sometimes the practical curing rate cannot be obtained, and the curing reaction hardly proceeds to a sufficient extent.

In the present invention, as the curing catalyst, one or more kinds selected from a titanium catalyst, an aluminum catalyst and a zirconium catalyst are used, and other curing catalysts can be simultaneously used to an extent not to degrade the effect of the present invention. Examples of the curing catalyst include metal salts of carboxylic acids such as tin 2-ethylhexanoate, tin versatate and bismuth 2-ethylhexanoate; tetravalent organotin compounds such as dibutyltin dilaurate, dibutyltin maleate, dibutyltin phthalate, dibutyltin dioctanoate, dibutyltin bis(2-ethylhexanoate), dibutyltin bis(m-ethylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin bis(acetylacetonate), dibutyltin bis(ethylacetoacetate), a reaction product of dibutyltin oxide and a silicate compound, and a reaction product of dibutyltin oxide and a phthalic acid ester. However, depending on an adding amount of the organotin compound, there is a case where toxicity of the obtained curing composition becomes strong.

A filler can be added to the composition of the present invention. Examples of the fillers include reinforcing fillers such as fumed silica, precipitated silica, crystalline silica, fused silica, dolomite, anhydrous silicic acid, hydrous silicic acid and carbon black; fillers such as ground calcium carbonate, precipitated calcium carbonate, magnesium carbonate, diatomite, sintered clay, clay, talc, titanium oxide, bentonite, organic bentonite, ferric oxide, aluminum fine powder, flint powder, zinc oxide, active zinc white, shirasu balloon, glass microballoon, organic microballoons of phenolic resin and vinylidene chloride resin, and resin powders such as PVC powder and PMMA powder; and fibrous fillers such as asbestos, glass fiber and glass filament. When a filler is used, the used amount thereof is 1 to 250 parts by weight, and preferably 10 to 200 parts by weight with respect to 100 parts by weight of the polymer of the component (A).

As described in Japanese Patent Laid-Open No. 2001-181532, it is possible to homogeneously mix the above described filler with a dehydrating agent such as oxidized calcium, put the mixture in a bag made of an air-tight material to be sealed and then allowing to stand for a proper period of time to dehydrate and dry previously. The use of this low molecular weight filler makes it possible to improve storage stability in the case of one-component composition.

Additionally, when preparing a highly transparent composition, as described in Japanese Patent Laid-Open No. 11-302527, it is possible to use, as a filler, a polymer powder prepared by using a polymer such as methyl methacrylate as a starting material or a non-crystalline silica. Also as described in Japanese Patent Laid-Open No. 2000-38560, a highly transparent composition can be obtained by using, as a filler, a hydrophobic silica which is a fine powder of silicon dioxide having hydrophobic groups bonded to the surface thereof. The surface of a fine powder of silicon dioxide has generally silanol groups (—SiOH), but can be formed into a hydrophobic silica by reacting those silanol groups with halides of organosilicon or alcohols to produce —SiO— hydrophobic group. Specifically, the hydrophobic silica is obtained by reacting silanol groups being present in the surface of the fine powder of silicon dioxide with dimethylsiloxane, hexamethyldisilazane, dimethyldichlorosilane, trimethoxyoctylsilane, trimethylsilane or the like. A fine powder of silicon dioxide in which the surface thereof is formed by silanol groups (—SiOH) is called a hydrophilic fine powder of silica.

When it is desired to obtain a cured article high in strength by use of these fillers, preferable is a filler mainly selected from fumed silica, precipitated silica, crystalline silica, fused silica, dolomite, anhydrous silicic acid, hydrous silicic acid, carbon black, surface treated fine calcium carbonate, sintered clay, clay and active zinc white; a desirable effect is obtained when such a filler is used within a range from 1 to 200 parts by weight with respect to 100 parts by weight of the reactive silicone group-containing organic polymer (A). Additionally, when it is desired to obtain a cured article low in tensile strength and large in elongation at break, a desirable effect is obtained by use of a filler mainly selected from titanium oxide, calcium carbonate such as ground calcium carbonate and magnesium carbonate, talc, ferric oxide, zinc oxide and shirasu balloon within a range from 5 to 200 parts by weight with respect to 100 parts by weight of the reactive silicone group-containing organic polymer (A). It is to be noted that in general, the calcium carbonate exhibits, with increasing specific surface area value thereof, an increasing improvement effect of the tensile strength at break, elongation at break and adhesion of the cured article. Needless to say, these fillers may be used either each alone or in admixtures of two or more thereof. When calcium carbonate is used, it is desirable to use surface treated fine calcium carbonate in combination with calcium carbonate larger in particle size such as ground calcium carbonate. The particle size of surface treated fine calcium carbonate is preferably not more than 0.5 µm, and the surface treatment is preferably carried out by treating with a fatty acid or a fatty acid salt. The calcium carbonate larger in particle size is preferably not less than 1 µm in particle size, and can be used without being subjected to surface treatment.

For the purpose of improving the workability (cutting property, etc) of the composition and deglossing the surface of the cured article, organic balloons and inorganic balloons are preferably added. Such fillers can be subjected to surface treatment, and may be used each alone or can be used in admixtures of two or more thereof. For the purpose of improving the workability (cutting property, etc), the particle sizes of these balloons are preferably not more than 0.1 mm. For the purpose of deglossing the surface of the cured article, the particle sizes are preferably 5 to 300 µm.

On the grounds that the cured article of the composition of the present invention is satisfactory in chemical resistance and the like, the composition of present invention is suitably used for joints of housing exterior wall such as sizing boards, in particular, ceramic sizing boards, for an adhesive for exterior wall tiles, for an adhesive for exterior wall tiles remaining in the joints and for the like purposes; in this connection, it is desirable that the design of the exterior wall and the design of the sealant are in harmony with each other. Particularly, posh exterior walls have come to be used by virtue of sputter coating and mixing colored aggregates. When the composition of the present invention is blended with a scale-like or granulated material having a diameter of not less than 0.1 mm, preferably of the order of 0.1 to 5.0 mm, the cured article comes to be in harmony with such posh exterior walls, and is excellent in chemical resistance, so that the composition concerned comes to be an excellent composition in the sense that the exterior appearance of the cured article remains unchanged over a long period of time. Use of a granulated material provides a dispersed sand-like or sandstone-like surface with a rough texture, while use of a scale-like material provides an irregular surface based on the scale-like shape of the material.

The preferable diameter, blended amount and materials for the scale-like or granulated material are described in Japanese Patent Laid-Open No. 9-53063 as follows.

The diameter is not less than 0.1 mm, preferably of the order of 0.1 to 5.0 mm, and there is used a material having an appropriate size in conformity with the material quality and pattern of exterior wall. Materials having a diameter of the order of 0.2 mm to 5.0 mm and materials having a diameter of the order of 0.5 mm to 5.0 mm can also be used. In the case of a scale-like material, the thickness is set to be as thin as the order of 1/10 to 1/5 the diameter (the order of 0.01 to 1.00 mm). The scale-like or granulated material is transported to the construction site as a sealant on condition that the material is beforehand mixed in the main component of the sealant, or is mixed in the main component of the sealant at the construction site when the sealant is used.

The scale-like or granulated material is blended in a content of the order of 1 to 200 parts by weight with respect to 100 parts by weight of a composition such as a sealant composition and an adhesive composition. The blended amount is appropriately selected depending on the size of the scale-like or granulated material, and the material quality and pattern of exterior wall.

As the scale-like or granulated material, natural products such as silica sand and mica, synthetic rubbers, synthetic resins and inorganic substances such as alumina are used. The material is colored in an appropriate color so as to match the material quality and pattern of exterior wall to heighten the design quality when filled in the joints.

A preferable finishing method and the like are described in Japanese Patent Laid-Open No. 9-53063.

Additionally, when a balloon (preferably the mean particle size thereof is not less than 0.1 mm) is used for a similar purpose, the surface is formed to have a dispersed sand-like or sandstone-like surface with a rough texture, and a reduction of weight can be achieved. The preferable diameter, blended amount and materials for the balloon are described in Japanese Patent Laid-Open No. 10-251618 as follows.

The balloon is a sphere-shaped material with a hollow interior. Examples of the material for such a balloon include inorganic materials such as glass, shirasu and silica; and organic materials such as phenolic resin, urea resin, polystyrene and Saran™; however, the material concerned is not limited to these examples; an inorganic material and an organic material can be compounded, or can be laminated to form multiple layers. An inorganic balloon, an organic balloon, a balloon made of a compounded inorganic-organic material or the like can be used. Additionally, as a balloon to be used, either a type of balloon or an admixture of multiple types of balloons can be used. Moreover, a balloon with the processed surface thereof or with the coated surface thereof can be used, and additionally, a balloon with the surface thereof subjected to treatment with various surface treatment agents can also be used. More specifically, examples are an organic balloon coated with calcium carbonate, talc, titanium oxide and the like, and an inorganic balloon subjected to surface treatment with a silane coupling agent.

For the purpose of obtaining a dispersed sand-like or sandstone-like surface with a rough texture, the particle size of the balloon is preferably not less than 0.1 mm. A balloon of a particle size of the order of 0.2 mm to 5.0 mm or a balloon of a particle size of the order of 0.5 mm to 5.0 mm can also be used. Use of a balloon of a particle size of less than 0.1 mm sometimes only increases the viscosity of the composition, and yields no rough texture, even when the used amount of the balloon is large. The blended amount of the balloon can be easily determined in conformity with the desired degree of the dispersed sand-like or sandstone-like rough texture. Usually, it is desirable that a balloon of not less than 0.1 mm in particle size is blended in a ratio of 5 to 25 vol % in terms of the volume concentration in the composition. When the volume concentration of the balloon is less than 5 vol %, no rough texture can be obtained, while when the volume concentration of the balloon exceeds 25 vol %, the viscosity of the sealant and that of the adhesive tend to become high to degrade the workability, and the modulus of the cured article becomes high, so that the basic performance of the sealant and that of the adhesive tend to be impaired. The preferable volume concentration to balance with the basic performance of the sealant is 8 to 22 vol %.

When a balloon is used, there can be added an antislip agent described in Japanese Patent Laid-Open No. 2000-154368 and an amine compound to make irregular and degloss the surface of the cured article as described in Japanese Patent Laid-Open No. 2001-164237, in particular, a primary amine and/or a secondary amine having a melting point of not less than 35° C.

Specific examples of the balloon are described in the following publications: Japanese Patent Laid-Open Nos. 2-129262, 4-8788, 4-173867, 5-1225, 7-113073, 9-53063, 10-251618, 2000-154368 and 2001-164237, and WO97/05201 pamphlet.

Additionally, thermally expandable fine hollow particles disclosed in Japanese Patent Laid-Open No. 2004-51701 or 2004-66749 can be used. The thermally expandable fine hollow particles are plastic spherical particulates produced by surrounding a low boiling point compound such as a hydrocarbon having 1 to 5 carbon atoms with a high molecular weight shell material (vinylidene chloride copolymer, acrylonitrile copolymer or vinylidene chloride-acrylonitrile copolymer). When the adhered portion obtained by using the composition of the present invention is heated, gas pressure inside the shell of the thermally expandable fine hollow particles is increased and the high molecular weight shell material is softened to markedly expand its volume and functions to cause peeling at the adhesion interface. By the addition of the thermally expandable fine hollow particles, it is possible to obtain an adhesive composition which can be peeled easily only by heating without breakage of material when adhesion becomes unnecessary and also can be peeled by heating without using an organic solvent.

When the composition of the present invention includes the particles of the cured article derived from a sealant, the cured article can make irregularities on the surface to improve the design quality. The preferable diameter, blended amount and materials of the cured article particle material derived from a sealant is described in Japanese Patent Laid-Open No. 2001-115142 as follows. The diameter is preferably of the order of 0.1 to 1 mm, and further preferably of the order of 0.2 to 0.5 mm. The blended amount is preferably 5 to 100 wt %, and further preferably 20 to 50 wt % in the curable composition. Examples of the materials include urethane resin, silicone, modified silicone and polysulfide rubber. No constraint is imposed on the materials as long as the materials can be used as sealants; however, modified silicone sealants are preferable.

To the composition of the present invention can be added an adhesion-imparting agent. No particular constraint is imposed on the adhesion-imparting resins, and usual adhesion-imparting resins can be used irrespective of solid form or liquid form at ordinary temperature. Specific examples of such adhesion-imparting resins include styrene block copolymers, hydrogenated products thereof, phenolic resins, modified phenolic resins (for example, cashew oil-modified phenolic resins, tall oil-modified phenolic resins and the like), terpene phenolic resins, xylene-phenol resins, cyclopentadiene-phenol resins, cumarone-indene resins, rosin resins, rosin ester resins, hydrogenated rosin ester resins, xylene resins, low molecular weight polystyrene resins, styrene copolymer resins, petroleum resins (for example, C5 hydrocarbon resin, C9 hydrocarbon resin, C5C9 hydrocarbon copolymer resin and the like), hydrogenated petroleum resins, terpene resins, DCPD resin-petroleum resin and the like. Those resins may be used either each alone or in combinations of two or more thereof. Examples of the styrene block copolymers and hydrogenated products thereof include styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene block copolymer (SIBS) and the like. The above described adhesion-imparting resins may be used either each alone or in combinations of two or more thereof.

The adhesion-imparting resins are used within a range from 5 to 1,000 parts by weight, preferably from 10 to 100 parts by weight with respect to 100 parts by weight of the organic polymer (A).

A plasticizer can be added to the composition of the present invention. Addition of a plasticizer makes it possible to adjust the viscosity and slump property of the curable composition and the mechanical properties such as tensile strength and elongation of the cured article obtained by curing the composition. Examples of the plasticizer include phthalates such as dibutyl phthalate, diheptyl phthalate, di(2-ethylhexyl) phthalate and butyl benzyl phthalate; nonaromatic dibasic acid esters such as dioctyl adipate, dioctyl sebacate, dibutyl sebacate and diisodecyl succinate; aliphatic esters such as butyl oleate and methyl acetyl ricinolate; phosphates such as tricresyl phosphate and tributyl phosphate; trimellitates; chlorinated paraffins; hydrocarbon oils such as alkyldiphenyls and partially hydrogenated terphenyls; process oils; epoxy plasticizers such as epoxidized soybean oil and benzyl epoxystearate.

Additionally, a polymer plasticizer can be used. When a polymer plasticizer is used, the initial physical properties are maintained over a longer period of time than when a low molecular weight plasticizer is used which is a plasticizer containing no polymer component in the molecule. Moreover, the drying property (also referred to as coating property) can be improved when an alkyd coating material is applied onto the cured article concerned. Examples of the polymer plasticizer include vinyl polymers obtained by polymerizing vinyl monomers by means of various methods; polyalkylene glycol esters such as diethylene glycol dibenzoate, triethylene glycol dibenzoate and pentaerythritol ester; polyester plasticizers obtained from dibasic acids such as sebacic acid, adipic acid, azelaic acid and phthalic acid and dihydric alcohols such as ethylene glycol, diethylene glycol, triethylene glycol, propylene glycol and dipropylene glycol; polyethers including polyether polyols each having a molecular weight of not less than 500, additionally not less than 1,000 such as polyethylene glycol, polypropylene glycol and polytetramethylene glycol, and the derivatives of these polyether polyols in which the hydroxy groups in these polyether polyols are substituted with ester groups, ether groups and the like; polystyrenes such as polystyrene and poly-α-methylstyrene; and polybutadiene, polybutene, polyisobutylene, butadiene-acrylonitrile and polychloroprene. However, the polymer plasticizer concerned is not limited to these examples.

Of these polymer plasticizers, the polymer plasticizers which are compatible with the polymer of component (A) are preferable. In this regard, polyethers and vinyl polymers are preferable. Additionally, the use of polyethers as plasticizers improves the surface curability and deep-part curability, and causes no curing retardation after storage, and hence polyethers are preferable; of polyethers, polypropylene glycol is more preferable. Additionally, from the viewpoint of the compatibility, weather resistance and heat resistance, vinyl polymers are preferable. Of the vinyl polymers, acryl polymers and/or methacryl polymers are preferable, and acryl polymers such as polyalkylacrylate are further preferable. As the polymerization method to produce acryl polymers, the living radical polymerization method is preferable because this method can lead to narrow molecular weight distributions and low viscosities, and the atom transfer radical polymerization method is further preferable. Additionally, it is preferable to use a polymer based on the so-called SGO process which is obtained by continuously block-polymerizing an alkyl acrylate monomer at a high temperature under a high pressure, as described in Japanese Patent Laid-Open No. 2001-207157.

The number average molecular weight of the polymer plasticizer is preferably 500 to 15,000, more preferably 800 to 10,000, further preferably 1,000 to 8,000, particularly preferably 1,000 to 5,000, and most preferably 1,000 to 3,000. When the molecular weight is too low, the plasticizer is removed with time due to heat and by rainfall, and hence it is made impossible to maintain the initial physical properties over a long period of time, and the coating property with the alkyd coating cannot be improved. On the other hand, when the molecular weight is too high, the viscosity becomes high and the workability is degraded. No particular constraint is imposed on the molecular weight distribution of the polymer plasticizer. However, it is preferable that the molecular weight distribution is narrow; the molecular weight distribution is preferably less than 1.80, more preferably not more than 1.70, further preferably not more than 1.60, yet further preferably not more than 1.50, particularly preferably not more than 1.40 and most preferably not more than 1.30.

The number average molecular weight of a vinyl polymer is measured with the GPC method, and that of a polyether polymer is measured with the terminal group analysis method. Additionally, the molecular weight distribution (Mw/Mn) is measured with the GPC method (relative to polystyrene standard).

Additionally, the polymer plasticizer either may have no reactive silicon group or may have a reactive silicon group. When the polymer plasticizer has a reactive silicon group, the polymer plasticizer acts as a reactive plasticizer, and can prevent the migration of the plasticizer from the cured article. When the polymer plasticizer has a reactive silicon group, the average number of reactive silicon groups per molecule is not more than 1, and preferably not more than 0.8. When the reactive silicon group-containing plasticizer, in particular, a reactive silicon group-containing oxyalkylene polymer is used, it is necessary that the number average molecular weight thereof is lower than that of the organic polymer (A).

The plasticizers may be used either each alone or in combinations of two or more thereof. Additionally, a low molecular weight plasticizer and a polymer plasticizer may be used in combination. It is to be noted that these plasticizers can also be blended when the polymer is produced.

The used amount of the plasticizer is 5 to 150 parts by weight, preferably 10 to 120 parts by weight, and further preferably 20 to 100 parts by weight, with respect to 100 parts by weight of the polymer of the component (A). When the used amount is less than 5 parts by weight, the effect as the plasticizer is not exhibited, while when the used amount exceeds 150 parts by weight, the mechanical strength of the cured article is insufficient.

To the curable composition of the present invention may be added, as case demands, a compound to hydrolytically produce a compound having a monovalent silanol group in the molecule thereof. This compound has an effect of decreasing the modulus of the cured article without degrading the stickiness of the surface of the cured article. Particularly, a compound to produce trimethylsilanol is preferable. Examples of the compound to hydrolytically produce a compound having a monovalent silanol group in the molecule thereof include a compound described in Japanese Patent Laid-Open No. 5-117521. Additionally, examples of such a compound include a compound which is a derivative of an alkyl alcohol such as hexanol, octanol or decanol, and produces a silicon compound to hydrolytically produce $R_3SiOH$ such as trimethylsilanol, and a compound described in Japanese Patent Laid-Open No. 11-241029 which is a derivative of a polyhydric alcohol having three or more hydroxy groups such as trimethylolpropane, glycerin, pentaerythritol or sorbitol, and produces a silicon compound to hydrolytically produce $R_3SiOH$ such as trimethylsilanol.

Additionally, there can be cited such a compound as described in Japanese Patent Laid-Open No. 7-258534 which is a derivative of oxypropylene polymer and produces a silicon compound to hydrolytically produce $R_3SiOH$ such as trimethylsilanol. Moreover, there can be used a polymer described in Japanese Patent Laid-Open No. 6-279693 which contains a hydrolyzable silicon-containing group capable of cross-linking and a silicon-containing group capable of hydrolytically forming a monosilanol-containing compound.

The compound to hydrolytically produce a compound having a monovalent silanol group in the molecule thereof is used within a range from 0.1 to 20 parts by weight, and preferably from 0.5 to 10 parts by weight, with respect to 100 parts by weight of the reactive silicon group-containing organic polymer (A).

To the curable composition of the present invention, according to need, a thixotropy providing agent (antisagging agent) may be added for the purpose of preventing sagging and improving workability. No particular constraint is imposed on the antisagging agent; however, examples of the antisagging agent include polyamide waxes; hydrogenated castor oil derivatives; and metal soaps such as calcium stearate, aluminum stearate and barium stearate. Additionally, when a rubber powder having a particle size of 10 to 500 µm as described in Japanese Patent Laid-Open No. 11-349916, and an organic fiber as described in Japanese Patent Laid-Open No. 2003-155389 are used, a composition having high thixotropy and satisfactory workability can be obtained. These thixotropy providing agents (antisagging agents) may be used either each alone or in combinations of two or more thereof. The thixotropy providing agents each are used within a range from 0.1 to 20 parts by weight with respect to 100 parts by weight of the reactive silicon group-containing organic polymer (A).

In the composition of the present invention, a compound containing an epoxy group in one molecule can be used. Use of an epoxy group-containing compound can increase the recovery properties of the cured article. Examples of the epoxy group-containing compound include compounds such as epoxidized unsaturated oils and fats, epoxidized unsaturated fatty acid esters, alicyclic epoxy compounds and epichlorohydrin derivatives, and admixtures of these compounds. More specific examples include epoxidized soybean oil, epoxidized flaxseed oil, bis(2-ethylhexyl)-4,5-epoxycyclohexane-1,2-dicarboxylate (E-PS), epoxyoctyl stearate and epoxybutyl stearate. Of these, E-PS is particularly preferable. It is recommended that these epoxy group-containing compounds each are used within a range from 0.5 to 50 parts by weight with respect to 100 parts by weight of the reactive silicon group-containing organic polymer (A).

For the composition of the present invention, a photocuring substance can be used. Use of a photocuring substance forms a coating film of the photocuring substance on the surface of the cured article to improve the stickiness and the weather resistance of the cured article. A photocuring substance means a substance which undergoes a chemical change, caused by action of light, of the molecular structure thereof in a fairly short time to result in changes of the physical properties such as curability. Among such a large number of compounds known are organic monomers, oligomers, resins and compositions containing these substances, and any commercially available substances concerned can optionally be adopted. As representative photocuring substances, unsaturated acryl compounds, polyvinyl cinnamates, azidized resins and the like can be used. The unsaturated acryl compounds are monomers, oligomers and admixtures of the monomers and the oligomers, the monomers and oligomers each having one or a few acryl or methacryl unsaturated groups; examples of the unsaturated acryl compounds include monomers such as propylene (or butylene, or ethylene)glycol di(meth)acrylate and neopentylglycol di(meth)acrylate, and oligoesters of not more than 10,000 in molecular weight related to these monomers. Specific examples include special acrylates (bifunctional) such as ARONIX M-210, ARONIX M-215, ARONIX M-220, ARONIX M-233, ARONIX M-240 and ARONIX M-245; special acrylates (trifunctional) such as ARONIX M-305, ARONIX M-309, ARONIX M-310, ARONIX M-315, ARONIX M-320 and ARONIX M-325; and special acrylates (multifunctional) such as ARONIX M-400. Those compounds which each have acrylic functional groups are particularly preferable, and additionally, those compounds which each have, on average, three or more acrylic functional groups in one molecule are preferable (all the aforementioned ARONIXs are the products of Toagosei Co., Ltd.).

Examples of the polyvinyl cinnamates include photosensitive resins having cinnamoyl groups as photosensitive groups, namely, those compounds obtained by esterification of polyvinyl alcohol with cinnamic acid; and additionally, a large number of derivatives of polyvinyl cinnamates. Azidized resins are known as photosensitive resins having azide groups as photosensitive groups; common examples of the azidized resins include a rubber photosensitive solution added with an azide compound as a photosensitive agent, and additionally, the compounds detailed in "photosensitive resins" (published by Insatu Gakkai Shuppanbu, Mar. 17, 1972, p. 93, p. 106 and p. 117); and these compounds can be used each alone or in admixtures thereof, and in combination with sensitizers to be added according to need. It is to be noted that addition of sensitizers such as ketones and nitro compounds and accelerators such as amines sometimes enhances the effect. It is recommended that the photocuring substance is used within a range from 0.1 to 20 parts by weight and preferably from 0.5 to 10 parts by weight with respect to 100 parts by weight of the reactive silicon group-containing organic polymer (A); when the content of the photocuring substance is less than 0.1 part by weight, no effect to increase the weather resistance is displayed, while when the content exceeds 20 parts by weight, the cured article tends to be too hard and cracked.

For the composition of the present invention, an oxygen-curable substance can be used. Examples of the oxygen-curable substance include unsaturated compounds reactable with the oxygen in the air, which react with the oxygen in the air and form a cured coating film around the surface of the cured article to act to prevent the surface stickiness and the sticking of dust and grime to the surface of the cured article and to do the like. Specific examples of the oxygen-curable substance include drying oils represented by wood oil, flaxseed oil and the like and various alkyd resins obtained by modifying these compounds; acryl polymers, epoxy resins and silicon resins all modified with drying oils; liquid polymers such as 1,2-polybutadiene and 1,4-polybutadiene obtained by polymerizing or copolymerizing diene compounds such as butadiene, chloroprene, isoprene and 1,3-pentadiene, and polymers derived from C5 to C8 dienes, liquid copolymers such as NBR, SBR and the like obtained by copolymerizing these diene compounds with monomers such as acrylonitrile, styrene and the like having copolymerizability so as for the diene compounds to dominate, and various modified substances of these compounds (maleinized modified substances, boiled oil-modified substances, and the like). These substances can be used either each alone or in combinations of two or more thereof. Of these substances, wood oil and liquid diene polymers are particularly preferable. Additionally, in some cases, when catalysts to accelerate the oxidation curing reaction and metal dryers are used in combination with these substances, the effect is enhanced. Examples of these catalysts and metal dryers include metal salts such as cobalt naphthenate, lead naphthenate, zirconium naphthenate, cobalt octylate and zirconium octylate; and amine compounds. It is recommended that the oxygen-curing substance is used within a range from 0.1 to 20 parts by weight and further preferably from 0.5 to 10 parts by weight with respect to 100 parts by weight of the reactive silicon group-containing organic polymer (A); when the used amount is less than 0.1 part by weight, improvement of stain-proof property becomes insufficient, while when the used amount exceeds 20 parts by weight, the tensile property and the like of the cured article tends to be impaired. It is recommended that the oxygen-curing substance is used in combination with a photocuring substance as described in Japanese Patent Laid-Open No. 3-160053.

For the composition of the present invention, an antioxidant (antiaging agent) can be used. Use of an antioxidant can increase the heat resistance of the cured article. Examples of the antioxidant can include hindered phenol antioxidants, monophenyl antioxidants, bisphenol antioxidants and polyphenol antioxidants, and hindered phenol antioxidants are particularly preferable. Similarly, the following hindered amine photostabilizers can also be used: TINUVIN 622LD, TINUVIN 144; CHIMASSORB944LD and CHIMASSORB119FL (all produced by Ciba-Geigy Japan Ltd.); MARK LA-57, MARK LA-62, MARK LA-67, MARK LA-63 and MARK LA-68 (all produced by Adeka Corporation); and SANOL LS-770, SANOL LS-765, SANOL LS-292, SANOL LS-2626, SANOL LS-1114 and SANOL LS-744 (all produced by Sankyo Co., Ltd.). Specific examples of the antioxidants are described also in Japanese Patent Laid-Open Nos. 4-283259 and 9-194731. It is recommended that the antioxidant is used within a range from 0.1 to 10 parts by weight and further preferably from 0.2 to 5 parts by weight with respect to 100 parts by weight of the reactive silicon group-containing organic polymer (A).

For the composition of the present invention, a photostabilizer can be used. Use of a photostabilizer can prevent the photooxidation degradation of the cured article. Examples of the photostabilizer include benzotriazole compounds, hindered amine compounds, benzoate compounds and the like; hindered amine compounds are particularly preferable. It is recommended that the photostabilizer is used within a range from 0.1 to 10 parts by weight and further preferably from 0.2 to 5 parts by weight with respect to 100 parts by weight of the reactive silicon group-containing organic polymer (A). Specific examples of the photostabilizer are described in Japanese Patent Laid-Open No. 9-194731.

When the photocuring substance is used for the composition of the present invention, in particular, when an unsaturated acryl compound is used, it is preferable to use a tertiary amine-containing hindered amine photostabilizer as a hindered amine photostabilizer as described in Japanese Patent Laid-Open No. 5-70531 for the purpose of improving the storage stability of the composition. Examples of the tertiary amine-containing hindered amine photostabilizer include TINUVIN 622LD, TINUVIN 144 and CHIMASSORB119FL (all produced by Ciba-Geigy Japan Ltd.); MARK LA-57, LA-62, LA-67 and LA-63 (all produced by Adeka Corporation); and SANOL LS-765, SANOL LS-292, SANOL LS-2626, SANOL LS-1114 and SANOL LS-744 (all produced by Sankyo Co., Ltd.).

For the composition of the present invention, an ultraviolet absorber can be used. Use of an ultraviolet absorber can increase the surface weather resistance of the cured article. Examples of the ultraviolet absorber include benzophenone compounds, benzotriazole compounds, salicylate compounds, substituted tolyl compounds and metal chelate compounds; benzotriazole compounds are particularly preferable. The ultraviolet absorber is used within a range from 0.1 to 10 parts by weight, and further preferably from 0.2 to 5 parts by weight with respect to 100 parts by weight of the reactive silicon group-containing organic polymer (A). It is preferable that a phenol antioxidant, a hindered phenol antioxidant, a hindered amine photostabilizer and a benzotriazole ultraviolet absorber are used in combination.

To the composition of the present invention, an epoxy resin can be added. The composition added with an epoxy resin is particularly preferable as an adhesive, in particular, an adhesive for exterior wall tile. Examples of the epoxy resin include epichlorohydrin-bisphenol A-type epoxy resins, epichlorohydrin-bisphenol F-type epoxy resins, flame resistant epoxy resins such as glycidyl ether of tetrabromobisphenol A, novolac-type epoxy resins, hydrogenated bisphenol A-type epoxy resins, epoxy resins of the type of glycidyl ether of bisphenol A propyleneoxide adduct, p-oxybenzoic acid glycidyl ether ester-type epoxy resins, m-aminophenol epoxy resins, diaminodiphenylmethane epoxy resins, urethane modified epoxy resins, various alicyclic epoxy resins, N,N-diglycidylaniline, N,N-diglycidyl-o-toluidine, triglycidyl isocyanurate, polyalkylene glycol diglycidyl ether, glycidyl ethers of polyhydric alcohols such as glycerin, hydantoin-type epoxy resins and epoxidized substances of unsaturated polymers such as petroleum resins; however the epoxy resin is not limited to these examples, and commonly used epoxy resins can be used. Epoxy resins having at least two epoxy groups in one molecule are preferable because such compositions are high in reactivity when curing is made, and the cured articles can easily form three dimensional networks. Examples of further preferable epoxy resins include bisphenol A-type epoxy resins or novolac-type epoxy resins. The ratio of the used amount of each of these epoxy resins to the used amount of the reactive silicon group-containing organic polymer (A) falls, in terms of weight ratio, in the range such that organic polymer (A)/epoxy resin=100/1 to 1/100. When the ratio of organic polymer (A)/epoxy resin is less than 1/100, the effect of improving the impact strength and the toughness of the cured article of the epoxy resin becomes hardly obtainable, while when the ratio of organic polymer (A)/epoxy resin exceeds 100/1, the strength of the cured article of the organic based polymer becomes insufficient. The preferable ratio of the used amounts varies depending on the application of the curable resin composition and hence cannot be unconditionally determined; for example, when the impact resistance, flexibility, toughness, peel strength and the like of the cured article of the epoxy resin are to be improved, it is recommended that with respect to 100 parts by weight of the epoxy resin, 1 to 100 parts by weight of the component (A), further preferably 5 to 100 parts by weight of the component (A) is used. On the other hand, when the strength of the cured article of the component (A) is to be improved, it is recommended that with respect to 100 parts of the component (A), 1 to 200 parts by weight of the epoxy resin, further preferably 5 to 100 parts by weight of the epoxy resin is used.

When the epoxy resin is added, as a matter of course, a curing agent to cure the epoxy resin can be applied together to the composition of the present invention. No particular constraint is imposed on the usable epoxy resin-curing agent, and commonly used epoxy resin-curing agents can be used. Specific examples of the epoxy resin-curing agent include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and polyether with amine terminal groups; tertiary amines such as 2,4,6-tris(dimethylaminomethyl)phenol and tripropylamine, and salts of those tertiary amines; polyamide resins; imidazoles; dicyandiamides; borontrifluoride complexes; carboxylic anhydrides such as phthalic anhydride, hexahydrophthalic anhydride, tetrahydrophthalic anhydride, dodecynylsuccinic anhydride, pyromellitic anhydride and chlorendic anhydride; alcohols; phenols; carboxylic acids; and diketone complexes of aluminum and zirconium. However, the epoxy resin-curing agent is not limited to these examples. Additionally, the curing agents may be used either each alone or in combinations of two or more thereof.

When an epoxy resin-curing agent is used, the used amount thereof falls within a range from 0.1 to 300 parts by weight with respect to 100 parts by weight of the epoxy resin.

As an epoxy resin-curing agent, a ketimine can be used. A ketimine is stable when no moisture is present, but moisture decomposes the ketimine into a primary amine and a ketone; the thus produced primary amine acts as a room temperature curable curing agent to cure the epoxy resin. Use of a ketimine makes it possible to obtain a one-component type composition. Such a ketimine can be obtained by condensation reaction of an amine compound and a carbonyl compound.

For the synthesis of a ketimine, an amine compound and a carbonyl compound well known in the art can be used. For example, the following compounds can be used as such an amine compound: diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine and p,p'-biphenylenediamine; polyvalent amines such as 1,2,3-triaminopropane, triaminobenzene, tris(2-aminoethyl)amine and tetrakis(aminomethyl)methane; polyalkylenepolyamines such as diethylenetriamine, triethylenetriamine and tetraethylenepentamine; polyoxyalkylene polyamines; and aminosilanes such as γ-aminopropyltriethoxysilane, N-(β-aminoethyl)-γ-aminopropyltrimethoxysilane and N-(β-aminoethyl)-γ-aminopropylmethyldimethoxysilane. Additionally, the following compounds can be used as such a carbonyl compound: aldehydes such as acetaldehyde, propionaldehyde, n-butylaldehyde, isobutylaldehyde, diethylacetaldehyde, glyoxal and benzaldehyde; cyclic ketones such as cyclopentanone, trimethylcyclopentanone, cyclohexanone and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone and diisobutyl ketone; and β-dicarbonyl compounds such as acetylacetone, methyl acetoacetate, ethyl acetoacetate, dimethyl malonate, diethyl malonate, methyl ethyl malonate and dibenzoylmethane.

When an imino group is present in the ketimine, the imino group can be reacted with styrene oxide; glycidyl ethers such as butyl glycidyl ether and allyl glycidyl ether; and glycidyl esters. These ketimines may be used either each alone or in combinations of two or more thereof; these ketimines each are used within a range from 1 to 100 parts by weight with respect to 100 parts by weight of the epoxy resin, the used amount of each of the ketimines varies depending on the type of the epoxy resin and the type of the ketimine.

To the curable composition of the present invention can be added a phosphorous-based plasticizer such as polyphosphoric acid ammonium or tricresyl phosphate and a flame retardant such as aluminum hydroxide, magnesium hydroxide or thermally expandable graphite. These flame retardants may be used either each alone or in combinations of two or more thereof.

The flame retardant is used within a range from 5 to 200 parts by weight, and preferably from 10 to 100 parts by weight with respect to 100 parts by weight of the component (A).

To the composition of the present invention can be added a solvent for the purposes of decreasing a viscosity, enhancing thixotropy and improving workability. No particular constraint is imposed on the solvent, and various compounds can be used. Specific examples thereof include hydrocarbon solvents such as toluene, xylene, heptane, hexane and petroleum solvents; halogen solvents such as trichloroethylene; ester solvents such as ethyl acetate and butyl acetate; ketone solvents such as acetone, methyl ethyl ketone and methyl isobutyl ketone; ether solvents; alcohol solvents such as methanol, ethanol and isopropanol; and silicone solvents such as hexamethylcyclotrisiloxane, octamethylcyclotetrasiloxane and decamethylcyclopentasiloxane. When a solvent is used, the boiling point of the solvent is preferably not less than 150° C., more preferably not less than 200° C., particularly preferably not less than 250° C. from the viewpoint of a problem with contamination to the air when the composition is used indoor. These solvents may be used either each alone or in combinations of two or more thereof.

It is to be noted that when the blended amount of the solvents is abundant, in some cases, toxicity to human body becomes high, and a volume shrinkage of the cured article occurs. Accordingly, the blended amount of the solvents is preferably not more than 3 parts by weight, more preferably not more than 1 part by weight with respect to 100 parts by weight of the organic polymer of the component (A), and it is most preferable that no solvents are contained substantially in the composition.

To the curable composition of the present invention, various additives can be added according to need for the purpose of regulating the physical properties of the curable composition or the cured article. Examples of such additives include curing regulators, radical inhibitors, metal deactivators, antiozonants, phosphorus-based peroxide decomposers, lubricants, pigments, foaming agents, ant-proofing agents and mildewproofing agents. These various additives may be used either each alone or in combinations of two or more thereof. Specific examples of additives other than the specific examples cited in the present specification are described, for example, in Japanese Patent Examined Publication Nos. 4-69659 and 7-108928, Japanese Patent Laid-Open Nos. 63-254149, 64-22904, 2001-72854 and the like.

The curable composition of the present invention can also be prepared as a one-component type composition curable after application with moisture in the air in such a way that all the blended components are beforehand blended together and hermetically stored. The curable composition of the present invention can also be prepared as two-component type composition in such a way that a compound agent is prepared as a curing agent by blending together a curing catalyst, a filler, a plasticizer and water, and the thus blended material is mixed with a polymer composition before use. From the viewpoint of workability, a one-component type composition is preferable.

When the above described curable composition is of the one-component type, all the blended components are blended together beforehand, so that it is preferable that the blended components containing moisture are used after dehydrating and drying, or the components are dehydrated by reducing pressure or the like while being kneaded for blending. When the above described curable composition is of the two-component type, it is not necessary to blend a curing catalyst with the main component containing a reactive silicon group-containing polymer, and hence there is little fear of gelation even when some moisture is contained in the blended components; however, when a long term storage stability is required, it is preferable to carry out dehydration and drying. As for the methods of dehydration and drying, a thermal drying method is suitable for a powdery solid substance or the like, while a reduced pressure dehydration method or a dehydration method which uses a synthetic zeolite, active alumina, silica gel, quick lime or magnesium oxide is suitable for a liquid substance. Additionally, there can be adopted a method in which a small amount of an isocyanate compound is added to make its isocyanate group react with water for dehydration, or a method in which 3-ethyl-2-methyl-2-(3-methylbutyl)-1,3-oxazolidine is added to make it react with water for dehydration. In addition to these dehydration and drying methods, addition of the following compounds further improves the storage stability: lower alcohols such as methanol and ethanol; and alkoxysilane compounds such as n-propyltrimethoxysilane, vinyltrimethoxysilane, vinylmethyldimethoxysilane, methylsilicate, ethylsilicate, γ-mercaptopropylmethyldimethoxysilane, γ-mercaptopropylmethyldiethoxysilane and γ-glycidoxypropyltrimethoxysilane.

It is particularly preferable that the used amount of a dehydrating agent, in particular, a silicon compound capable of reacting with water such as vinyltrimethoxysilane falls within a range from 0.1 to 20 parts by weight, and preferably 0.5 to 10 parts by weight with respect to 100 parts by weight of the reactive silicon group-containing organic polymer (A).

No particular constraint is imposed on the preparation method of the curable composition of the present invention; for example, there can be adopted a common method in which the above described components are blended together and kneaded with a mixer, a roll or a kneader at room temperature or under heating, or a common method in which the above described components are dissolved and mixed by use of a small amount of an appropriate solvent.

The curable composition of the present invention forms three dimensional networks when exposed to the air due to the action of the moisture to be cured into a solid matter having a rubber-like elasticity.

The curable composition of the present invention can be used as tackifiers, sealants for buildings, ships, vehicles and road, adhesives, mold forming materials, vibration-proof material, damping materials, soundproof materials, foaming materials, coating materials, spraying materials and the like. It is preferable that the cured article obtained by curing the curable composition of the present invention is used as a sealant and an adhesive because the cured article is excellent in flexibility and adhesion. Additionally, the curable composition of the present invention can be used in various applications as liquid sealants to be used in materials for electric and electronic components such as backside sealants for solar cells, electric insulating materials such as insulating coating materials for use in electric wire and cable, elastic adhesives, contact type adhesives, spray type sealants, crack repairing materials, adhesives for tiling, powdery coating materials, casting materials, medical rubber materials, medical adhesives, medical instrument sealants, food packaging materials, sealants for joints in exterior materials such as sizing boards, coating materials, primers, electromagnetic wave shielding conductive materials, heat conducting materials, hot melt materials, electric and electronic potting agents, films, gaskets, various molding materials, antirust and waterproof sealants for edges (cut portions) of wire glass and laminated glass, vehicle components, electric appliance components, various machinery components and the like. Moreover, the curable composition of the present invention can adhere alone or in combination with a primer to a wide variety of substrates including glass, porcelain, woods, metals and molded resin articles, and accordingly, can be used as various types of sealing and adhesive compositions. Additionally, the curable composition of the present invention can be used as adhesives for interior panels, adhesive for exterior panels, adhesives for tiling, adhesives for stone tiling, adhesives for finishing ceiling, adhesives for finishing floor, adhesives for finishing wall, adhesives for vehicle panels, adhesives for assembling electric, electronic and precision instruments, sealants for direct glazing, sealants for double glazing, sealants for the SSG technique and sealants for working joints of buildings.

EXAMPLES

In the next place, the present invention is specifically described on the basis of examples and comparative examples, but the present invention is not limited by these examples and comparative examples.

Synthesis Example 1

By use of a polyoxypropylene diol having a molecular weight of about 2,000 as an initiator and zinc hexacyanocobaltate-glyme complex as a catalyst, polymerization of propylene oxide was carried out to yield a polypropylene oxide having a number average molecular weight of about 25,500 (a molecular weight relative to polystyrene standard measured by using a HLC-8120 GPC manufactured by Tosoh Corp. as a liquid delivery system, a column of TSK-GEL H-type manufactured by Tosoh Corp., and THF as a solvent). Then, a methanol solution of NaOMe was added in an amount of 1.2 equivalents with respect to the hydroxy group of the above hydroxy group-terminated polypropylene oxide, the methanol was distilled off, and allyl chloride was further added to thereby convert the terminal hydroxy group into an allyl group. The unreacted allyl chloride was distilled off under reduced pressure. To 100 parts by weight of the obtained crude allyl-terminated polypropylene oxide, 300 parts by weight of n-hexane and 300 parts by weight of water were added. The mixture thus obtained was stirred to mix, and then the water was removed by centrifugal separation. To the hexane solution thus obtained, 300 parts by weight of water was further added, the mixture thus obtained was stirred to mix, the water was again removed by centrifugal separation, and then the hexane was distilled off under reduced pressure. Thus, an allyl group-terminated bifunctional polypropylene oxide having a number average molecular weight of about 25,500 was obtained (referred to as polymer P).

100 Parts by weight of the polymer P and 1.1 parts by weight of trimethoxysilane were reacted at 90° C. for two hours by using, as a catalyst, 150 ppm of isopropanol solution of platinum-vinylsiloxane complex containing 3 wt % platinum to yield a polyoxypropylene polymer (A-1) terminated with trimethoxysilyl group. Additionally, the silylation ratio (T'/T) was obtained on the basis of $^1$H-NMR (measured in $CDCl_3$ as a solvent by use of a JNM-LA400 manufactured by JEOL Ltd.) with the aid of the following method. The silylation ratio was found on the basis of the ratio of the following two relative values (T) and (T'), namely, (T'/T): the relative value (T) of the integrated peak intensity of the allyl terminal protons —$CH_2$—CH=$CH_2$ (around 5.1 ppm) to the integrated peak intensity of the methyl group (around 1.2 ppm) in the polypropylene oxide main chain of the polymer P, and the relative value (T') of the integrated peak intensity of the protons —$CH_2$—$CH_2$—$\underline{CH_2}$—$Si(OCH_3)_3$ (around 0.6 ppm) of the methylene group bonded to the silicon atom of the terminal silyl group to the integrated peak intensity of the methyl group (around 1.2 ppm) in the polypropylene oxide main chain in the silyl-terminated polypropylene oxide (A-1) after hydrosilylation reaction. The number of terminal trimethoxysilyl groups per molecule was 1.3 on average.

Synthesis Example 2

By use of a polyoxypropylene diol having a molecular weight of about 2,000 as an initiator and zinc hexacyanocobaltate-glyme complex as a catalyst, polymerization of propylene oxide was carried out to yield a hydroxyl group-terminated bifunctional polypropylene oxide (referred to as polymer Q) having a number average molecular weight of about 25,500 (a molecular weight relative to polystyrene standard measured by using a HLC-8120 GPC manufactured by Tosoh Corp. as a liquid delivery system, a column of TSK-GEL H-type manufactured by Tosoh Corp., and THF as a solvent).

To 100 parts by weight of the polymer Q was added 1.8 parts by weight of γ-isocyanatepropyltrimethoxysilane, and the mixture was reacted at 90° C. for five hours to yield a polyoxypropylene polymer (A-2) terminated with trimethoxysilyl group. Additionally, the silylation ratio [(U-U'/U)] was obtained on the basis of $^1$H-NMR (measured in $CDCl_3$ as a solvent by use of a JNM-LA400 manufactured by JEOL Ltd.) with the aid of the following method. The silylation ratio was found on the basis of the ratio of the following two relative values (U) and (U'), namely, [(U-U'/U)]: the relative value (U) of the integrated peak intensity of the terminal hydroxyl group —OH (around 3.8 ppm) to the integrated peak intensity of the methyl group (around 1.2 ppm) in the polypropylene oxide main chain of the polymer Q, and the relative value (U') of the integrated peak intensity after the reaction. The number of terminal trimethoxysilyl groups per molecule was 1.4 on average.

Synthesis Example 3

100 Parts by weight of the polymer P and 0.93 part by weight of methyldimethoxysilane were reacted at 90° C. for five hours by using, as a catalyst, 150 ppm of isopropanol solution of platinum-vinylsiloxane complex containing 3 wt % platinum to yield a polyoxypropylene polymer (A-3) having 1.3 terminal methyldimethoxysilyl groups on average.

Examples 1 to 12 and Comparative Examples 1 to 9

Blending was carried out according to the following formulations by using, as the polyoxyalkylene polymer of the component (A) having a trialkoxysilyl group, the polymers (A-1 to A-2) obtained in Synthesis Examples 1 to 2, "ST-50" and "ST-53" produced by Hanse Chemie which were commercially available trimethoxysilyl group-containing organic polymers and the methyldimethoxysilyl group-containing polymer (A-3) obtained in Synthesis Example 3.

100 Parts by weight of the organic polymer, 120 parts by weight of a surface-treated colloidal calcium carbonate (Hakuenka CCR produced by Shiraishi Kogyo Kaisha, Ltd.), 20 parts by weight of a titanium oxide (Tipaque R-820 produced by Ishihara Sangyo Kaisha, Ltd.), 55 parts by weight of a plasticizer: diisodecyl phthalate (SANSOCIZER DIDP produced by New Japan Chemical Co., Ltd.), 2 parts by weight of a thixotropy-imparting agent (Disparlon 6500 produced by Kusumoto Chemicals, Ltd.), 1 part by weight of a photostabilizer (Sanol LS-765 produced by Sankyo Co., Ltd.), 1 part by weight of an ultraviolet absorber (Sumisorb 400 produced by Sumitomo Chemical Co., Ltd.) and 1 part by weight of an antioxidant (Irganox 1010 produced by Ciba-Geigy Japan Ltd.) were weighed out respectively; then, all these ingredients were fully kneaded together with a three-roll paint mill to yield each main component.

Then the component (B); titanium diisopropoxidebis(ethylacetoacetate) (Orgatix TC-750 of Matsumoto Trading Co., Ltd.) or dibutyltin bis(acetylacetonate) (Neostann U-220 produced by Nitto Kasei Kaisha, Ltd.) as an organotin catalyst, and the component (C); vinyltrimethoxysilane (A-171 produced by Toray Dow Corning Co., Ltd.) and N-(β-aminoethyl)-γ-aminopropyltrimethoxysilane (A-1120 produced by Toray Dow Corning Co., Ltd.) were weighed out respectively according to the formulations shown in Table 1. Then, these ingredients were added to the main components, and the mixtures thus obtained were stirred with a spatula for 3 minutes to mix together. After mixing, the thus obtained compositions each were filled in a molding frame of about 5 mm in thickness with the aid of a spatula, and the surface of each of the filled compositions was fully flattened. The planarization completion time was set as the curing starting time; the surface of each of the compositions was touched with a spatula, and the skin formation time was measured as the time when the composition no longer stuck to the spatula. The skin formation time was measured at 23° C. at 50% RH.

The compositions of the blended components, and the results of the evaluation of the curability (skin formation time) are shown in Table 1. Additionally, the ratio (a/b) of the total mole (a) of titanium atoms in the component (B) to the total mole (b) of silicon atoms in the component (C) is shown in Table 1. In the table, when the skin formation time is not less than 96 hours, it is referred to as "N".

TABLE 1

| Compositions (part by weight) | | Example 1 | Example 2 | Example 3 | Example 4 |
|---|---|---|---|---|---|
| Trialkoxysilyl group-containing organic polymer Component (A) | A-1 | 100 | 100 | 100 | 100 |
| | A-2 | | | | |
| | ST-50 | | | | |
| | ST-53 | | | | |
| Methyldimethoxysilyl group-containing organic polymer | A-3 | | | | |
| Filler | Hakuenka CCR | 120 | 120 | 120 | 120 |
| Plasticizer | DIDP | 55 | 55 | 55 | 55 |
| Titanium oxide | Tipaque R-820 | 20 | 20 | 20 | 20 |
| Thixotropy-imparting agent | Disparlon 6500 | 2 | 2 | 2 | 2 |
| Ultraviolet absorber | Sumisorb 400 | 1 | 1 | 1 | 1 |
| Photostabilizer | Sanol LS765 | 1 | 1 | 1 | 1 |
| Antioxidant | Irganox 1010 | 1 | 1 | 1 | 1 |
| Component (B) | TC-750 | 4 | 4 | 4 | 2 |
| Organotin catalyst | U-220 | | | | |

TABLE 1-continued

| Component (C) | A-171 | 2 | 2 | 2 | 2 |
|---|---|---|---|---|---|
| | A-1120 | 3 | 2 | 1 | 3 |
| a/b | | 0.35 | 0.42 | 0.52 | 0.17 |
| Skin formation time (hour) | | 4 | 2.5 | 1 | 30 |

| | | Example | | | |
|---|---|---|---|---|---|
| Compositions (part by weight) | | 5 | 6 | 7 | 8 |
| Trialkoxysilyl group-containing | A-1 | 100 | 100 | | |
| organic polymer | A-2 | | | 100 | 100 |
| Component (A) | ST-50 | | | | |
| | ST-53 | | | | |
| Methyldimethoxysilyl group-containing | A-3 | | | | |
| organic polymer | | | | | |
| Filler | Hakuenka CCR | 120 | 120 | 120 | 120 |
| Plasticizer | DIDP | 55 | 55 | 55 | 55 |
| Titanium oxide | Tipaque R-820 | 20 | 20 | 20 | 20 |
| Thixotropy-imparting agent | Disparlon 6500 | 2 | 2 | 2 | 2 |
| Ultraviolet absorber | Sumisorb 400 | 1 | 1 | 1 | 1 |
| Photostabilizer | Sanol LS765 | 1 | 1 | 1 | 1 |
| Antioxidant | Irganox 1010 | 1 | 1 | 1 | 1 |
| Component (B) | TC-750 | 2 | 1 | 4 | 2 |
| Organotin catalyst | U-220 | | | | |
| Component (C) | A-171 | 1 | 2 | 2 | 2 |
| | A-1120 | 1.5 | 3 | 3 | 3 |
| a/b | | 0.35 | 0.09 | 0.35 | 0.17 |
| Skin formation time (hour) | | 4 | 70 | 2 | 10 |

| | | Example | | | |
|---|---|---|---|---|---|
| Compositions (part by weight) | | 9 | 10 | 11 | 12 |
| Trialkoxysilyl group-containing | A-1 | | | | |
| organic polymer | A-2 | 100 | | | |
| Component (A) | ST-50 | | | 80 | 80 | 80 |
| | ST-53 | | | 20 | 20 | 20 |
| Methyldimethoxysilyl group-containing | A-3 | | | | |
| organic polymer | | | | | |
| Filler | Hakuenka CCR | 120 | 120 | 120 | 120 |
| Plasticizer | DIDP | 55 | 55 | 55 | 55 |
| Titanium oxide | Tipaque R-820 | 20 | 20 | 20 | 20 |
| Thixotropy-imparting agent | Disparlon 6500 | 2 | 2 | 2 | 2 |
| Ultraviolet absorber | Sumisorb 400 | 1 | 1 | 1 | 1 |
| Photostabilizer | Sanol LS765 | 1 | 1 | 1 | 1 |
| Antioxidant | Irganox 1010 | 1 | 1 | 1 | 1 |
| Component (B) | TC-750 | 1 | 4 | 2 | 1 |
| Organotin catalyst | U-220 | | | | |
| Component (C) | A-171 | 2 | 2 | 2 | 2 |
| | A-1120 | 3 | 3 | 3 | 3 |
| a/b | | 0.09 | 0.35 | 0.17 | 0.09 |
| Skin formation time (hour) | | 30 | 2 | 9 | 24 |

| | | Comparative Example | | | |
|---|---|---|---|---|---|
| Compositions (part by weight) | | 1 | 2 | 3 | 4 |
| Trialkoxysilyl group-containing | A-1 | 100 | 100 | | |
| organic polymer | A-2 | | | 100 | |
| Component (A) | ST-50 | | | | |
| | ST-53 | | | | |
| Methyldimethoxysilyl group-containing | A-3 | | | | 100 |
| organic polymer | | | | | |
| Filler | Hakuenka CCR | 120 | 120 | 120 | 120 |
| Plasticizer | DIDP | 55 | 55 | 55 | 55 |
| Titanium oxide | Tipaque R-820 | 20 | 20 | 20 | 20 |
| Thixotropy-imparting agent | Disparlon 6500 | 2 | 2 | 2 | 2 |
| Ultraviolet absorber | Sumisorb 400 | 1 | 1 | 1 | 1 |
| Photostabilizer | Sanol LS765 | 1 | 1 | 1 | 1 |
| Antioxidant | Irganox 1010 | 1 | 1 | 1 | 1 |
| Component (B) | TC-750 | 0.5 | 1 | 0.5 | 4 |
| Organotin catalyst | U-220 | | | | |
| Component (C) | A-171 | 2 | 4 | 2 | 2 |
| | A-1120 | 3 | 6 | 3 | 3 |
| a/b | | 0.04 | 0.04 | 0.04 | 0.35 |
| Skin formation time (hour) | | N | N | N | N |

TABLE 1-continued

| Compositions (part by weight) | | Comparative Example | | | | |
|---|---|---|---|---|---|---|
| | | 5 | 6 | 7 | 8 | 9 |
| Trialkoxysilyl group-containing organic polymer Component (A) | A-1 | 100 | 100 | 100 | 100 | 100 |
| | A-2 | | | | | |
| | ST-50 | | | | | |
| | ST-53 | | | | | |
| Methyldimethoxysilyl group-containing organic polymer | A-3 | | | | | |
| Filler | Hakuenka CCR | 120 | 120 | 120 | 120 | 120 |
| Plasticizer | DIDP | 55 | 55 | 55 | 55 | 55 |
| Titanium oxide | Tipaque R-820 | 20 | 20 | 20 | 20 | 20 |
| Thixotropy-imparting agent | Disparlon 6500 | 2 | 2 | 2 | 2 | 2 |
| Ultraviolet absorber | Sumisorb 400 | 1 | 1 | 1 | 1 | 1 |
| Photostabilizer | Sanol LS765 | 1 | 1 | 1 | 1 | 1 |
| Antioxidant | Irganox 1010 | 1 | 1 | 1 | 1 | 1 |
| Component (B) | TC-750 | | | | | |
| Organotin catalyst | U-220 | 0.3 | 0.15 | 0.3 | 0.3 | 0.3 |
| Component (C) | A-171 | 2 | 2 | 1 | 2 | 2 |
| | A-1120 | 3 | 3 | 3 | 2 | 4 |
| a/b | | — | — | — | — | — |
| Skin formation time (hour) | | 0.5 | 1 | 0.4 | 0.6 | 0.4 |

As shown in Table 1, practical curabilities were displayed in the cases of the value a/b being more than 0.08 (Examples 1 to 12) when using a titanium catalyst as the component (B) of the present invention. However when the value a/b is not more than 0.08 (Comparative Examples 1 to 3), curabilities are lowered significantly. Additionally, when using the polyoxypropylene polymer having a terminal methyldimethoxysilane group (Comparative Example 4), even in the cases of the value a/b being more than 0.08 (Comparative Example 4), curability is not good, and no curing occurs 96 hours after. On the other hand, when the organotin catalyst is used as a curing catalyst (Comparative Examples 5 to 9), no correlation as recognized in the case of a titanium catalyst was displayed between the ratio of the total mole of tin atoms to the total mole of silicon atoms in the component (C) and the curability (skin formation time).

Synthesis Example 4

100 Parts by weight of the polymer P and 2.3 parts by weight of a silane compound represented by the following formula:

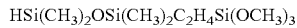

were reacted at 90° C. for five hours by using, as a catalyst, 150 ppm of isopropanol solution of platinum-vinylsiloxane complex containing 3 wt % platinum to yield a polyoxypropylene polymer (A-4) having 1.1 terminal trimethoxysilyl groups on average.

Synthesis Example 5

To a 2-butanol solution of the following monomer mixture heated to 105° C. was added dropwise over five hours a solution prepared by dissolving 2,2'-azobis(2-methylbutyronitrile) as a polymerization initiator, followed by one-hour "post-polymerization" to yield a (meth)acrylate polymer (A-5).

46.8 parts by weight of methyl methacrylate, 28.6 parts by weight of butyl acrylate, 20.1 parts by weight of stearyl methacrylate, 4.5 parts by weight of γ-methacryloxypropyltrimethoxysilane, 2.7 parts by weight of 2,2'-azobis(2-methylbutyronitrile)

Synthesis Example 6

After mixing the polymer (A-1) obtained in Synthesis Example 1 and the polymer (A-5) obtained in Synthesis Example 5 at 80/20 in a weight ratio of solid contents, a solvent was distilled off to yield a solvent-free polymer (A-6).

Examples 13 to 21 and Comparative Example 10

Blending was carried out according to the following method by using, as the trialkoxysilyl group-containing organic polymer of the component (A), the polymers (A-1, A-2, A-4, A-6) obtained in Synthesis Examples 1, 2, 4 and 6.

100 Parts by weight of the organic polymer (A), 120 parts by weight of a surface-treated colloidal calcium carbonate (Hakuenka CCR produced by Shiraishi Kogyo Kaisha, Ltd.), 20 parts by weight of a titanium oxide (Tipaque R-820 produced by Ishihara Sangyo Kaisha, Ltd.), 55 parts by weight of a plasticizer: diisodecyl phthalate (SANSOCIZER DIDP produced by New Japan Chemical Co., Ltd.), 2 parts by weight of a thixotropy-imparting agent (Disparlon 6500 produced by Kusumoto Chemicals, Ltd.), 1 part by weight of a photostabilizer (Sanol LS-765 produced by Sankyo Co., Ltd.), 1 part by weight of an ultraviolet absorber (Sumisorb 400 produced by Sumitomo Chemical Co., Ltd.) and 1 part by weight of an antioxidant (Irganox 1010 produced by Ciba-Geigy Japan Ltd.), the component (C); 2 parts by weight of vinyltrimethoxysilane (A-171 produced by Toray Dow Corning Co., Ltd.) and 3 parts by weight of N-(β-aminoethyl)-γ-aminopropyltrimethoxysilane (A-1120 produced by Toray Dow Corning Co., Ltd.), the component (B); titanium diisopropoxidebis (ethylacetoacetate) (Orgatix TC-750 of Matsumoto Trading Co., Ltd.), 14.3 parts by weight of zirconium n-butoxide (acetylacetonate)bis(ethylacetoacetate) (containing 36 wt % 1-butanol) (Orgatix ZC-570 of Matsumoto Trading Co., Ltd.), or 11 parts by weight of aluminum diisopropoxide (ethylacetoacetate) (containing 50 wt % No. 7 solvent (petroleum solvent)) (ALCH-50F produced by Kawaken Fine Chemicals Co., Ltd.), or 0.1 part by weight of dibutyltin laurate (STANN BL produced by Sankyo Organic Chemicals Co., Ltd.) as an organotin catalyst instead of the component (B) were added according to the formulations shown in Table 2. Then the mixture was kneaded under dehydrating condition in a state substantially free from moisture and sealed in a moisture-proof vessel to yield one-component type curable compositions. Ratios (a/b) of the total mole (a) of titanium atoms, aluminum atoms and zirconium atoms in the component (B) to the total mole (b) of silicon atoms in the component (C) in those compositions are shown in Table 2.

By use of the prepared one-component type curable compositions, various physical properties were investigated on the basis of the following procedures.

(Curability Test)

The curable compositions each were extruded from the cartridge and filled in a molding frame of about 5 mm in thickness with a spatula; the surface of each of the filled compositions was fully flattened, and the planarization completion time was set as the curing starting time. The surface of each of the compositions was touched with a spatula, and the skin formation time was measured as the time when the composition no longer stuck to the spatula. The skin formation time was measured at 23° C. at 50% RH. The results are shown in Table 2.

(Adhesion Test).

The curable compositions each were extruded from the cartridge so that the compositions each were adhered to an article to be adhered (polycarbonate and acrylic resin) to produce samples. The produced samples were aged at 23° C. for 7 days. Thereafter, the compositions were subjected to a 90 degree hand peel test to evaluate adhesion thereof. The breakdown conditions of the cured articles were observed and the cohesion failure rates were investigated. In the table, A, B and C denote the rates of 90 to 100%, 70 to 90% and 0 to 70%, respectively. The results obtained are shown in Table 2.

TABLE 2

| Compositions (part by weight) | | Example 13 | Example 14 | Example 15 | Example 16 | Example 17 |
|---|---|---|---|---|---|---|
| Component (A) | A-1 | 100 | 100 | | | |
| | A-2 | | | 100 | 100 | 100 |
| | A-4 | | | | | |
| | A-6 | | | | | |
| Filler | Hakuenka CCR | 120 | 120 | 120 | 120 | 120 |
| Plasticizer | DIDP | 55 | 55 | 55 | 55 | 55 |
| Titanium oxide | Tipaque R-820 | 20 | 20 | 20 | 20 | 20 |
| Thixotropy-imparting agent | Disparlon 6500 | 2 | 2 | 2 | 2 | 2 |
| Ultraviolet absorber | Sumisorb 400 | 1 | 1 | 1 | 1 | 1 |
| Photostabilizer | Sanol LS765 | 1 | 1 | 1 | 1 | 1 |
| Antioxidant | Irganox 1010 | 1 | 1 | 1 | 1 | 1 |
| Component (B) | TC-750 | 7.5 | 4 | 7.5 | 4 | 2 |
| | ZC-570 | | | | | |
| | ALCH-50F | | | | | |
| Organotin catalyst | STANN BL | | | | | |
| Component (C) | A-171 | 2 | 2 | 2 | 2 | 2 |
| | A-1120 | 3 | 3 | 3 | 3 | 3 |
| a/b | | 0.66 | 0.35 | 0.66 | 0.35 | 0.17 |
| Curability | Skin formation time (min) | 22 | 101 | 14 | 23 | 178 |
| Adhesion | Polycarbonate | A | A | A | A | A |
| | Acrylic resin | A | A | A | A | A |

| Compositions (part by weight) | | Example 18 | Example 19 | Example 20 | Example 21 | Com. Ex. 10 |
|---|---|---|---|---|---|---|
| Component (A) | A-1 | | | 100 | 100 | |
| | A-2 | | | | | |
| | A-4 | 100 | | | | 100 |
| | A-6 | | 100 | | | |
| Filler | Hakuenka CCR | 120 | 120 | 120 | 120 | 120 |
| Plasticizer | DIDP | 55 | 55 | 55 | 55 | 55 |
| Titanium oxide | Tipaque R-820 | 20 | 20 | 20 | 20 | 20 |
| Thixotropy-imparting agent | Disparlon 6500 | 2 | 2 | 2 | 2 | 2 |
| Ultraviolet absorber | Sumisorb 400 | 1 | 1 | 1 | 1 | 1 |
| Photostabilizer | Sanol LS765 | 1 | 1 | 1 | 1 | 1 |
| Antioxidant | Irganox 1010 | 1 | 1 | 1 | 1 | 1 |
| Component (B) | TC-750 | 7.5 | 4 | | | |
| | ZC-570 | | | 14.3 | | |
| | ALCH-50F | | | | 11 | |
| Organotin catalyst | STANN BL | | | | | 0.1 |
| Component (C) | A-171 | 2 | 2 | 2 | 2 | 2 |
| | A-1120 | 3 | 3 | 3 | 3 | 3 |
| a/b | | 0.66 | 0.35 | 0.74 | 0.74 | — |
| Curability | Skin formation time (min) | 53 | 80 | 103 | 134 | 258 |
| Adhesion | Polycarbonate | A | A | A | A | C |
| | Acrylic resin | A | A | A | A | C |

As shown in Table 2, when the components (B) and (C) are added to the organic polymer having a terminal trimethoxysilyl group so that the value a/b exceeds 0.08 (Examples 13 to 21), practical curability (skin formation time) is displayed. Additionally, in all of the cases, a cohesion failure occurs in various articles to be adhered (polycarbonate and acrylic resin).

On the other hand, in the case of using an organotin catalyst instead of the titanium catalyst of the component (B) (Comparative Example 10), adhesion to various articles to be adhered is not good.

The invention claimed is:

1. A curable composition comprising (A) an organic polymer having, as a silicon-containing group being capable of crosslinking by forming siloxane bonds, a reactive silicon group represented by the general formula (1):

   (1)

wherein X represents hydroxyl group or a hydrolyzable group and three Xs may be each the same or different, (B) one or more kinds selected from a titanium catalyst and a zirconium catalyst and (C) a low molecular weight compound containing a hydrolyzable silicon group and having a molecular weight of from 100 to 1,000, wherein a ratio (a/b) of the total mole (a) of titanium atoms and zirconium atoms of the component (B) to the total mole (b) of silicon atoms of the component (C) is larger than 0.15, and a main chain skeleton of said organic polymer (A) includes a urethane group, a urea group or a thiourethane group, wherein the organic polymer (A) is a polyoxypropylene polymer terminated with trimethoxysilyl group, said titanium catalyst is a titanium chelate which is a compound represented by the general formula (3):

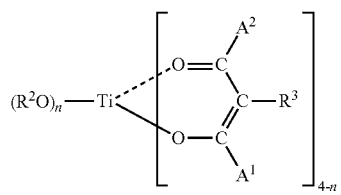   (3)

wherein $R^2$ and $R^3$ are hydrogen atom or a hydrocarbon group having 1 to 20 carbon atoms, $R^2$ and $R^3$ may be the same or different, n $R^2$s may be each the same or different, and (4-n) $R^3$s may be each the same or different; $A^1$ and $A^2$ are selected from $-R^4$ or $-OR^4$ where $R^4$ is a hydrocarbon group having 1 to 20 carbon atoms, $A^1$ and $A^2$ may be the same or different, (4-n) $A^1$s may be each the same or different and (4-n) $A^2$s may be each the same or different; n is 2, and/or a compound represented by the general formula (4):

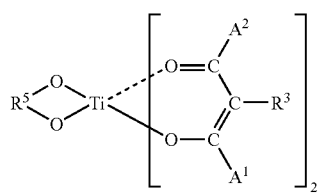   (4)

wherein $R^3$, $A^1$ and $A^2$ are the same as defined above; $R^5$ is a divalent hydrocarbon group having 1 to 20 carbon atoms, and said zirconium catalyst is a zirconium chelate which is a compound represented by the general formula (9):

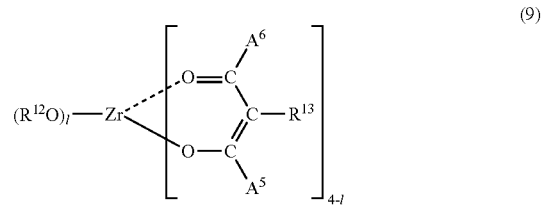   (9)

wherein $R^{12}$ and $R^{13}$ are hydrogen atom or a hydrocarbon group having 1 to 20 carbon atoms, $R^{12}$ and $R^{13}$ may be the same or different, l $R^{12}$s may be each the same or different, and (4-l) $R^{13}$s may be each the same or different; $A^5$ and $A^6$ are selected from $-R^{14}$ or $-OR^{14}$ where $R^{14}$ is a hydrocarbon group having 1 to 20 carbon atoms, $A^5$ and $A^6$ may be the same or different, (4-l) $A^5$s may be each the same or different, and (4-l) $A^6$s may be each the same or different; l is 1, and/or a compound represented by the general formula (10):

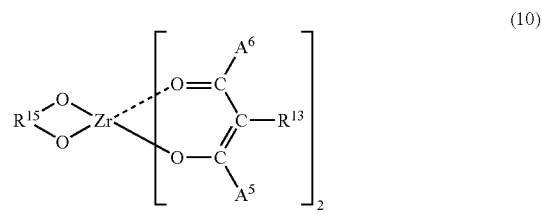   (10)

wherein $R^{13}$, $A^5$ and $A^6$ are the same as defined above; $R^{15}$ is a divalent hydrocarbon group having 1 to 20 carbon atoms, and the low molecular weight compound (C) is a silane coupling agent containing a trimethoxysilyl group.

2. The curable composition according to claim 1, wherein with respect to 100 parts by weight of the organic polymer (A), said one or more kinds (B) selected from a titanium catalyst and a zirconium catalyst are contained in an amount of from 0.1 to 15 parts by weight and said low molecular weight compound (C) is contained in an amount of from 0.1 to 15 parts by weight.

3. The curable composition according to claim 1, wherein a glass transition temperature of said organic polymer (A) is not more than 20° C.

4. The curable composition according to claim 1, wherein said component (B) is a titanium catalyst.

5. A sealant comprising said curable composition according to Claim 1.

6. An adhesive comprising said curable composition according Claim 1.

7. The curable composition according to claim 1, wherein with respect to 100 parts by weight of the organic polymer (A), said one or more kinds (B) selected from a titanium catalyst and a zirconium catalyst are contained in an amount of from 2 to 14.3 parts by weight and said low molecular weight compound (C) is contained in an amount of from 2.5 to 5 parts by weight.

8. The curable composition according to claim 1, wherein the low molecular weight compound (C) further contains a primary amino group and/or a vinyl group.

9. The curable composition according to claim 1, wherein the component (B) is titanium diisopropoxidebis(ethylacetoacetate).

10. The curable composition according to claim 1, wherein the component (B) is zirconium n-butoxide(acetylacetonate) bis(ethylacetoacetate).

11. The curable composition according to claim 1, wherein the low molecular weight compound (C) is N-(β-aminoethyl)-γ-aminopropyltrimethoxysilane and/or vinyltrimethoxysilane.

* * * * *